United States Patent
Mao et al.

(10) Patent No.: US 7,323,120 B2
(45) Date of Patent: Jan. 29, 2008

(54) COATED CARBONACEOUS PARTICLES PARTICULARY USEFUL AS ELECTRODE MATERIALS IN ELECTRICAL STORAGE CELLS, AND METHODS OF MAKING THE SAME

(75) Inventors: Zhenhua Mao, Ponca City, OK (US); H. Ernest Romine, Ponca City, OK (US); Mark W. Carel, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 399 days.

(21) Appl. No.: 10/501,311

(22) PCT Filed: Jan. 31, 2003

(86) PCT No.: PCT/US03/02972

§ 371 (c)(1),
(2), (4) Date: Jun. 21, 2005

(87) PCT Pub. No.: WO03/064560

PCT Pub. Date: Aug. 7, 2003

(65) Prior Publication Data

US 2005/0247914 A1    Nov. 10, 2005

Related U.S. Application Data

(63) Continuation-in-part of application No. 10/066,080, filed on Jan. 31, 2002, now abandoned.

(51) Int. Cl.
*H01B 1/04* (2006.01)
*H01M 4/58* (2006.01)

(52) U.S. Cl. .................................. 252/502; 429/231.8
(58) Field of Classification Search ............... 252/502; 429/231.8
See application file for complete search history.

(56) References Cited

U.S. PATENT DOCUMENTS

| | | | |
|---|---|---|---|
| 4,042,486 A | 8/1977 | Asano et al. | |
| 4,117,098 A | 9/1978 | Tatsumoto et al. | |
| 4,293,533 A | 10/1981 | Asano et al. | |
| 5,906,900 A | 5/1999 | Hayashi et al. | |
| 6,403,259 B1 * | 6/2002 | Kitagawa et al. | 429/231.4 |
| 6,596,437 B2 * | 7/2003 | Yoon et al. | 429/231.95 |
| 6,887,622 B2 * | 5/2005 | Ryu et al. | 429/231.8 |

FOREIGN PATENT DOCUMENTS

| | | |
|---|---|---|
| JP | 01-305859 | 12/1989 |
| JP | 09-231974 | 9/1997 |
| JP | 11-246209 | 9/1999 |

OTHER PUBLICATIONS

Patent Abstracts of Japan of 11-246209 Dated Sep. 14, 1999.
Patent Abstracts of Japan of 09-231974 Dated Sep. 5, 1997.
Patent Abstracts of Japan of 01-305859 Dated Dec. 11, 1989.

* cited by examiner

*Primary Examiner*—Mark Kopec
*Assistant Examiner*—Jaison Thomas

(57) ABSTRACT

A process for the production of coated carbonaceous particles including: providing a carbon residue forming material; providing particles of a carbonaceous material; mixing the carbon residue forming material and the particles of a carbonaceous material at an elevated temperature; depositing a coating of the carbon residue forming material onto the surface of the particles; and stabilizing the coated particles by subjecting the particles to an oxidation reaction. These coated carbonaceous particles are particularly useful in the manufacture of electrodes in electrical storage cells, particularly in rechargeable electrical storage cells.

52 Claims, 2 Drawing Sheets

COATED CARBONACEOUS PARTICLES PARTICULARY USEFUL AS ELECTRODE MATERIALS IN ELECTRICAL STORAGE CELLS, AND METHODS OF MAKING THE SAME

This application is a continuation-in-part of application Ser. No. 10/066,080 filed on Jan. 31, 2002, now abandoned which designated the U.S., claims the benefit thereof and incorporates the same by reference.

TECHNICAL FIELD

The present invention relates to graphitic materials which are useful as electrodes in batteries. More particularly the present invention relates to coated carbonaceous particles which find particular use as electrode materials, as well as methods for the manufacture of said coated carbonaceous particles.

BACKGROUND

Carbonaceous materials are widely used in electrical storage cells, also referred to as "batteries" due to their efficiency and reasonable cost. Various forms of carbonaceous materials are used. One such carbonaceous material is graphite, which is known to be useful in rechargeable storage cells, also referred to as "rechargeable batteries". In a salient example, graphitic materials are known to be useful as anode materials in rechargeable lithium ion, "Li-ion" storage cells. Li-ion cells are mainly used as the power sources in portable electronic devices.

As opposed to other classes of rechargeable batteries, i.e., e.g., nickel-cadmium and nickel-metal hydride storage cells, Li-ion cells are increasingly popular due to their relatively higher storage capacity, and their easily rechargeable nature. Due to such higher storage capacity per unit mass or unit volume, Li-ion cells may be produced which meet specific storage and current delivery requirements as they are smaller than similarly rated, nickel-cadmium and nickel-metal hydride storage cells. Consequently, Li-ion cells are popularly used in a growing number of devices, i.e., digital cameras, digital video recorders, computers, etc., where small sized devices are particularly desirable from a utility or consumer standpoint. Nonetheless, rechargeable Li-ion storage cells are not without their shortcomings, certain of which are dependent upon their materials of construction.

Popular types of Li-ion storage cells include electrodes formed of mesophase carbon micro beads (MCMB) or micronized mesophase carbon fiber (MMCF). However, both MCMB and MMCF are relatively expensive due to relatively complex manufacturing processes required for these materials. Further types of Li-ion storage cells include electrodes formed of comminuted or milled graphitic materials which are derived from purified natural graphite or synthetic graphite. While these materials exhibit satisfactory storage capacity, they unfortunately exhibit a low initial charging efficiency on their first cycle. Typically, the charging efficiency of these materials ranges widely, usually from as little as about 40% to as high as about 90%. It is known that the efficiency of these comminuted or milled graphitic materials is strongly dependent upon the morphology of the comminuted or milled graphitic particles. Due to their irregular nature, these pulvurent comminuted or milled graphitic materials frequently suffer from a low packing density which also limits the density from any electrode formed therefrom, which also limits the operating characteristics of a rechargeable storage cell. Also, due to their irregular nature, processing these pulvurent comminuted or milled graphitic materials into electrodes is difficult. In such electrodes formed from pulvurent comminuted or milled graphitic materials, it has been suggested that poor operating characteristics is in part attributable to the formation of a passive film on the surfaces of these pulvurent materials. Such a film is frequently described in the art as being a solid electrolyte interface ("SEI"). The formation of this SEI irreversibly consumes a quantifiable amount, frequently a significant amount of lithium ions (typically 15 to 50%) present in the cathode upon cell assembly or use.

Accordingly there exists a real and continuing need in the art for improved materials useful in the manufacture of storage cells, particularly rechargeable storage cells which exhibit improved operating characteristics. There also exist needs in the art for improved methods for the manufacture of improved materials useful in the manufacture of such storage cells, as well as for improved storage cells containing said improved materials.

SUMMARY

In one aspect the present invention provides graphitic materials which comprise coated carbonaceous particles, wherein the coating layer is formed of an oxidized, carbon residue forming material, which coating layer may be also graphitized. These coated carbonaceous particles are particularly useful in the manufacture of electrodes in electrical storage cells, particularly in rechargeable electrical storage cells.

The compositions of the invention provide high capacity and high efficiency carbon material, which can be derived from a wide variety of sources. Additionally, the compositions feature good powder flowability, which is particularly beneficial during any handling or manufacturing steps necessary to form these materials into useful electrodes or into other articles not specifically described herein.

A further aspect of the invention are free-flowing coated carbonaceous particles with substantially smooth coatings formed of an oxidized, carbon residue forming material, which coating layer may be also graphitized.

In further aspects of the invention there are provided methods for the manufacture of such coated carbonaceous particles.

A still further aspect of the invention relates to the use of said coated carbonaceous particles in electrical storage cells, particularly in rechargeable batteries. The coated powders prepared in accordance with the invention not only increase charge efficiency but also provided excellent processability for electrode fabrication.

In a yet further aspect of the invention there are provided methods for the manufacture of electrical storage cells, particularly rechargeable batteries which include said coated carbonaceous particles.

These and other aspects and features of the invention will become apparent from the following description of the invention and preferred embodiments thereof.

DESCRIPTION OF DRAWINGS

Like reference symbols in the various drawings indicate like elements.

DETAILED DESCRIPTION

Figure 1:
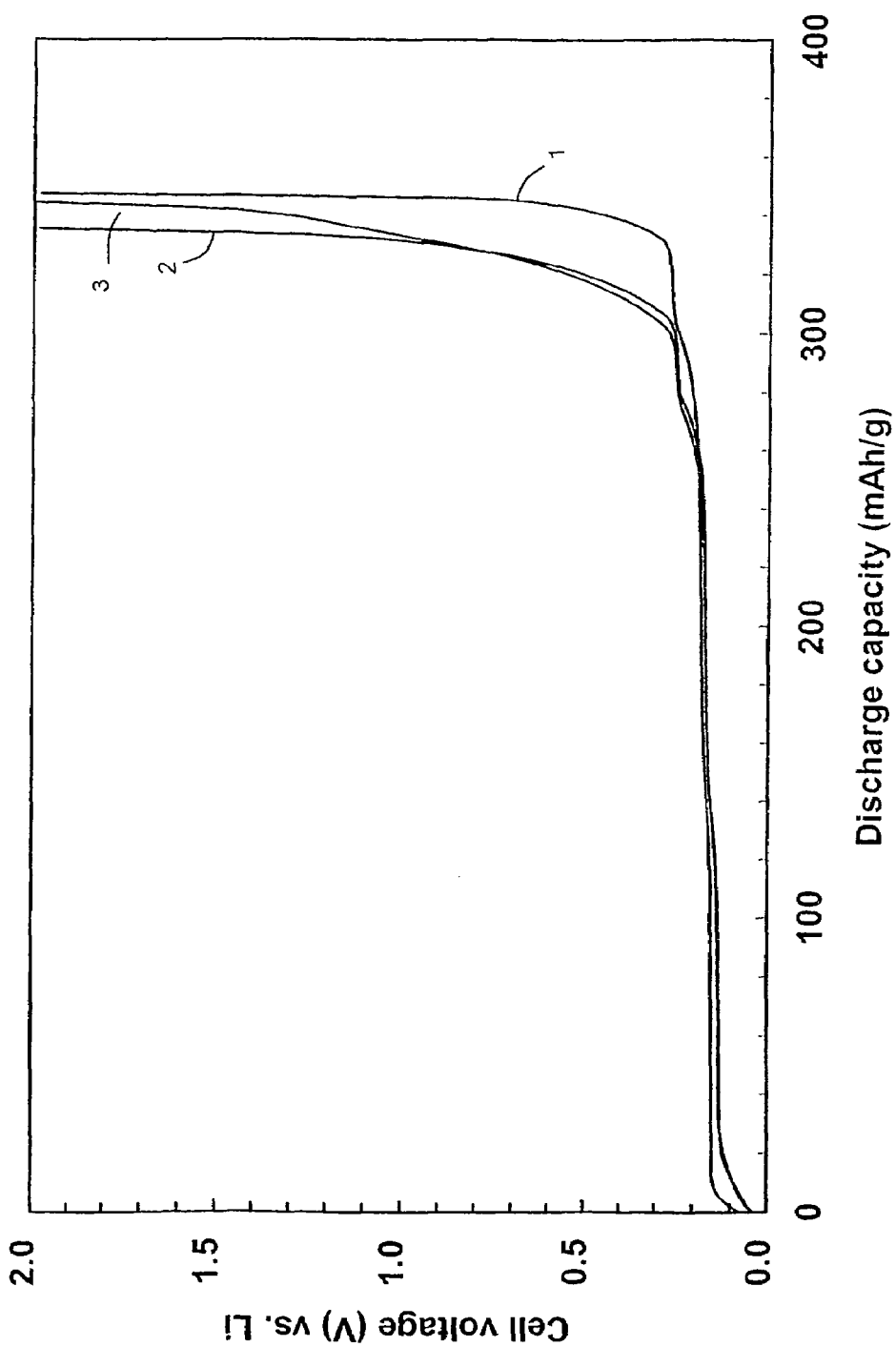
FIG. 1 shows a plot of electric potential as a function of discharge capacity for the materials prepared in Examples 43-45.

In one aspect the present invention provides processes for the manufacture of coated carbonaceous particles, which materials exhibit improved operating characteristics when used as electrodes in electrical storage cells, particularly in rechargeable electrical storage cells. Generally the process contemplates the steps of:

providing particles of a carbonaceous material;
providing a coating of a fusible, carbon residue forming material onto the surface of said particles;
stabilizing the coated particles by subjecting said particles to an oxidation reaction using an oxidizing agent;
subsequently carbonizing the coated particles; and,
thereafter optionally, but preferably graphitizing the coated particles.

Preferably the process provides particles having a substantially smooth coatings.

Particles of carbonaceous material are required for the practice of the invention. These may be obtained from a variety of sources, examples of which include pitches, petroleum and coal tar cokes, synthetic and natural graphites, soft carbons derived from organic and natural polymers as well as other sources of carbonaceous materials which are known in the manufacture of prior art electrodes although these sources are not elucidated here. Preferred sources of carbonaceous materials include calcined or un-calcined petroleum cokes, as well as natural and synthetic graphite. Particularly preferred sources of carbonaceous materials include calcined and un-calcined, highly crystalline "needle" cokes. Thus, preferred carbonaceous materials are either graphitic or form graphite on heating to graphitization temperatures of 2200° C. or higher. Fine particles of such materials are conveniently provided by milling, crushing, grinding or by any other means which can be used to provide a pulvurent carbonaceous material having particles of dimensions which are suitable for use in the formation of electrodes. Although the principles of the present invention are believed to be applicable to carbonaceous particles of varying sizes and particle size distributions, preferred carbonaceous particles having average particle sizes of up to about 150 μm, more preferably from about 5 μm to about 70 μm, and most preferably average particle sizes in the range of about 5 μm to about 45 μm are particularly preferred. Further, it is preferred that within these ranges, the particle size distribution is preferably such that not more than 10 weight % of the particles are smaller than 5 μm, not more than 10 weight % of the particles are larger than 60 m; further it is still more preferred that in addition to such a particle size distribution that the mean particle size is about 10 μm to about 30 μm.

According to a step of the inventive process, the carbonaceous particles are provided with a fusible, carbon residue forming material as a coating material. Preferred for use as the coating material are carbon residue forming materials which can be reacted with an oxidizing agent. Preferred compounds include those with a high melting point and a high carbon yield after thermal decomposition. Exemplary useful coating materials include heavy aromatic residues from petroleum, chemical process pitches; lignin from pulp industry; phenolic resins, and carbohydrate materials such as sugars and polyacrylonitriles. Especially preferred for use as coating materials are petroleum and coal tar pitches, and lignin which are readily available and have been observed to be effective as fusible, carbon residue forming materials.

It is to be understood that the carbon residue forming material may be any material which, when oxidized and then thermally decomposed in an inert atmosphere to a carbonization temperature of 850° C. or an even greater temperature forms a residue which is "substantially carbon". It is to be understood that "substantially carbon" indicates that at the residue is at least 90% by wt. carbon, preferably at least 95% by wt. carbon. It is also preferred that the carbon residue forming material form at least 10% and preferably at least 40% and more preferably at least 60% carbon residue on carbonization, based on the original mass of the carbon residue forming material.

Any organic compound that can be oxidized and then thermally decomposed to yield carbon residue can be used as the coating material. However, in coating processes in which the organic compounds are dissolved in solvent, aromatic compounds that include various molecular weights are preferred because of mutual dissolution of the compound with the solvent(s). Preferred compounds include those with a high melting point and a high carbon yield after thermal decomposition (e.g., petroleum and coal tar pitches).

Any useful technique for coating the carbonaceous particles may be used. By way of non-limiting examples, useful techniques include the steps of: liquefying the carbon residue forming material by a means such as melting or forming a solution with a suitable solvent combined with a coating step such as spraying the liquefied carbon residue forming material onto the carbonaceous particles, or dipping the carbonaceous particles in the liquefied carbon residue forming material and subsequently drying out any solvent. Further useful techniques include selective precipitation of a carbon residue forming material on the carbonaceous particles which may be preferred in certain circumstances.

A further technique which may be used includes providing a dry coating of the carbon residue forming material onto the carbonaceous particles such as by mixing or tumbling these materials until a coating of the carbon residue material is provided on the surface of the carbonaceous particles, after which the dry coating is then fused to provide a coating upon the surface of the carbonaceous particles. While any of these coating techniques may be practiced, preferred methods include those which provide a relatively uniform coating thickness of the carbon residue forming material on the carbonaceous particles and which minimize clumping or agglomeration of the coated particles. The amount of the carbon residue forming material deposited on the carbonaceous particles may also vary widely, and it is understood that this amount depends in part on factors including the uniformity of the coating and the specific form and surfaces of the carbonaceous particles. Although the amount of coating may vary from as little as 1% wt. to as much as 50% wt., expressed as the percentage of the mass of the coating relative to the total mass of the coated particles as measured by weighing the dry particles before and after coating, preferably the amount of coating ranges from about 2.5% wt. to about 25% wt., more preferably ranges from about 5% wt. to about 20% wt.

A particularly useful method of forming a uniform coating of a carbon-residue-forming material by precipitating the material onto the surface of the particles is provided according to the following process. First, a concentrated solution of the carbon-residue-forming material in a suitable solvent is formed. The solution of carbon residue forming material is prepared by combining the carbon residue forming material with a solvent or a combination of solvents. The solvent should be compatible with the carbon residue forming, i.e., coating, material and should dissolve all or a substantial portion of the coating material. Solvents include pure organic compounds or a mixture of different solvents. The choice of solvent(s) depends on the particular coating material used. Suitable solvents for dissolving the carbon residue forming material include, for example, benzene, toluene, xylene, quinoline, tetrahydrofuran, naphthalene, acetone, cyclohexanie, tetrahydronaphthalene (sold by DuPont under the trademark Tetralin), ether, water, methyl-pyrrolidinone, etc. When a petroleum or coal tar pitch is used as the carbon residue forming material, for example, solvents such as toluene, xylene, quinoline, tetrahydrofuran, Tetralin, naphthalene are preferred. The ratio of the solvent(s) to the carbon residue forming material in the solution and the temperature of the solution is controlled so that the carbon residue forming material completely or almost completely dissolves into the solvent. Typically, the solvent to carbon residue forming material ratio is less than 2, and preferably about 1 or less, and the carbon residue forming material is dissolved in the solvent at a temperature that is below the boiling point of the solvent.

Concentrated solutions wherein the solvent to solute ratio is less than about 2:1 are commonly known as flux solutions. Many pitch-type materials form concentrated flux solutions wherein the pitch is highly soluble when mixed with solvent at solvent to pitch ratios of 0.5 to 2.0. Dilution of these flux mixtures with the same solvent or a solvent in which the carbon residue forming material is less soluble results in partial precipitation of the carbon residue forming coating material. When this dilution and precipitation occurs in the presence of a suspension of carbonaceous particles, the particles act as nucleating sites for the precipitation. The result is an especially uniform coating of the carbon-residue-forming material on the particles.

Coating of the carbonaceous particles can be effected by mixing the particles into or with the solution of carbon residue forming material directly. When the particles are added to the solution of carbon residue forming material directly, additional solvent(s) is generally added to the resulting mixture to effect partial precipitation of the carbon residue forming material. The additional solvent(s) can be the same as or different than the solvents used to prepare the solution of carbon residue forming materials.

Alternatively, a suspension of particles of a carbonaceous material can be prepared by homogeneously mixing the particles in the same solvent used to form the solution of carbon residue forming material, in a combination of solvents or in a different solvent to a desired temperature, preferably below the boiling point of the solvent(s). The suspension of carbonaceous particles is then combined with the solution of carbon residue forming material causing a certain portion of the carbon residue forming material to deposit substantially uniformly on the surface of the carbonaceous particles.

The total amount and morphology of the carbon residue forming material that precipitates onto the surface of the particles depends on the portion of the carbon residue forming material that precipitates out from the solution, which in turn depends on the difference in the solubility of the carbon residue forming material in the initial solution and in the final solution. When the carbon residue forming material is a pitch, a wide range of molecular weight species are typically present. One skilled in the art would recognize that partial precipitation of such a material would fractionate the material such that the precipitate would be relatively high molecular weight and high melting and the remaining solubles would be relatively low molecular weight and low melting compared to the original pitch.

The solubility of the carbon residue forming material in a given solvent or solvent mixture depends on a variety of factors including, for example, concentration, temperature, and pressure. As stated earlier, dilution of concentrated flux solutions causes solubility to decrease. Since the solubility of the carbon-residue-forming material in an organic solvent increases with temperature, precipitation of the coating is further enhanced by starting the process at an elevated temperature and gradually lowering the temperature during the coating process. The carbon residue forming material can be deposited at either ambient or reduced pressure and at a temperature of about −5° C. to about 400° C. By adjusting the total ratio of solvent to the carbon residue forming material and the solution temperature, the total amount and hardness of the precipitated carbon residue forming material on the infusible carbon containing particles can be controlled.

The suspension of coated carbonaceous particles in the final diluted solution of carbon residue forming material generally has a ratio of solvent to carbon residue forming material of greater than about 2; and preferably greater than about 4. For example, where petroleum or coal tar pitch is chosen as the carbon residue forming material and toluene is chosen as the solvent, the ratio of toluene to the pitch should be less than or equal to 1 for the initial solution, but should be greater than 3, preferably greater than 5, for the mixture of particles, carbon residue forming material, and combined solvent(s). It would be understood by one skilled in the art that the specific solvent to carbon-residue-forming pitch ratio at the conclusion of the coating process depends on the carbon-forming-residue material and solvent selected for the process. On one hand, it is desirable to use as little solvent as possible because of the cost of solvent, while on the other hand, enough solvent is required so that the carbonaceous particles can be dispersed in the solvent.

Upon completion of the precipitation step, the coated particles are separated from the mixture of solvent, carbonaceous particles, and carbon residue forming material using conventional methods, such as, for example, centrifugal separation, or filtration. The particles then are optionally washed with solvent to remove residual pitch (or other carbon forming residue forming material) solution and dried using conventional methods.

The liquid remaining after separation of the coated particles includes solvent(s) and residual carbon residue forming material. The solvent can be recovered from the solution by conventional methods, such as, for example, distillation under reduced pressure or evaporation at elevated temperature. Preferably, the separation of solvent from the residual carbon forming material is carried out at elevated temperature so that the carbon residue remains in liquid form. If different solvents are used to prepare the coating material solution(s) and the precipitation solution, a multi-stage distillation system may be needed to recover the multiple solvents. The recovered solvent can be directly fed back to the system and reused in the process, while the carbon-residue-forming-material is discharged from the process.

According to a further step of the inventive process, the coating of the carbonaceous particles are rendered partly or completely infusible, preferably by oxidative stabilization. The coating of the carbonaceous particles are stabilized by subjecting said particles to an oxidation reaction using an oxidizing agent under appropriate reaction conditions. Generally, only mild to moderate reaction conditions are required. Typically the oxidation reaction is satisfactorily performed by contacting the coated carbonaceous particles with an oxidizing agent at elevated temperatures or by contacting the coated carbonaceous particles with an oxidizing agent at mild conditions and activating the oxidizing agent at elevated temperatures. Contact with the oxidizing agent can occur at ambient temperatures (approx. 20° C.) or at moderately elevated temperatures, (up to approx. 400° C.). Activation of the oxidizing agent would typically occur at moderately elevated temperatures up to 400° C. Preferably, the temperature of the oxidation reaction is maintained below the instantaneous melting point of the coating material, so to ensure that melting point of the coating material is not exceeded during the oxidation reaction.

The manner of practice of this step of the inventive process is understood to be dependent upon the form of the oxidizing agent utilized, which may be solid, liquid or gaseous under the reaction conditions. Likewise, various oxidation reaction processes and reaction conditions may be practiced and are considered to be within the scope of the present invention.

Wherein the oxidizing agent is a solid, it is required only that the solid oxidizing agent be placed in sufficiently intimate contact with the coated carbonaceous particles such that, under appropriate reaction conditions, a satisfactory degree of oxidation is obtained. This is most effectively accomplished by forming a liquid solution of the oxidizing agent, applying this solution to the coated particles and drying. When practical, it is preferred to apply the carbon residue forming material and oxidant coatings at the same time in a single step. Where necessary, the oxidizing agent can be brought to suitable reaction conditions in order to insure the initiation and success of an oxidation reaction. Such conditions may take place under ambient pressure and temperature conditions (approximately 20° C., 1 atm) however, depending upon the nature of the oxidizing agent, the nature of the carbon residue forming (coating) material, as well as in part the nature and form of any reaction vessel which may be used for the oxidation reaction, it may be desirous to modify the temperature and/or pressure, or both from ambient. Typically, elevating the temperature up to 400° C. facilitates the initiation and the subsequent oxidation reaction, but in fact, any temperature under the instantaneous melting temperature of the coating material can be successfully used. With regard to the nature of any reaction vessel, any conventionally used reaction vessel or device can be used. With regard to the identity of solid oxidizing agents, by way of non-limiting examples, these include: inorganic and organic oxidizers such as metal oxides and salts such as alkali nitrates and alkali sulfates such as are represented by $MNO_3$ and $M_2SO_4$, where M denotes an alkali metal, as well as $M'O_x$ where M' represents a transition metal. Exemplary solid oxidizing agents further include inorganic salts such as sodium nitrate ($NaNO_3$) and organic salts, as well as those described in the following examples.

Where the oxidizing agent is a liquid, it is required only that the oxidizing agent be provided in a liquid form which is compatible with the coated carbonaceous particles. It is clearly contemplated that the oxidizing agent itself need not constitute 100% of the liquid, but rather that the oxidizing agent be provided as a solution, suspension, or other fluid which comprises an oxidizing agent or agents therein. It is anticipated that when the oxidizing agent is supplied as a solution or suspension, it may be desirable to include a drying step so to dry the coated particles. It is contemplated that the oxidizing agent, when present in a liquid form, is also compatible with the coated carbonaceous particles namely, that any portion of the liquid does not act to undesirably degrade or solubilize the fusible, carbon residue forming material or for that matter, the carbonaceous particles themselves. By way of non-limiting example, exemplary oxidizing agents which are provided in a liquid form include various oxidizing acids such as nitric acid, perchlorate acid, phosphoric acid, sulfuric acid or as well as aqueous and non-aqueous solutions containing oxidizing salts such as peroxides and $KMnO_4$. Additional liquid oxidizing agents include peroxides and aryl quinones, as well as those described in one or more of the examples.

The nature of the condition of the oxidizing reaction is not critical to the practice of the invention wherein the oxidizing agent is in a liquid form. Rather, it is only required that the reaction conditions be appropriate to insure the oxidation of at least a portion of the coating provided to the carbonaceous particles such that they form a stabilized, coating thereupon. Any conventional reactor, and appropriate reaction conditions can be used. As described previously, with respect to solid oxidizing agents, the reaction conditions can take place at ambient temperature and pressure conditions, or may require different conditions depending upon the coating, the nature of the carbonaceous particles, the reaction vessel, and of course, the nature of the oxidizing agent utilized. With regard to reactor vessels, stirred reactor vessels which are optionally pressurized are conveniently used.

Where the oxidizing agent is gaseous, again it is required only that this gaseous oxidizing agent be brought into sufficient intimate contact with the coated carbonaceous particles under appropriate reaction condition in order to insure the oxidization reaction of the carbon residue forming material. According to this aspect of the invention, a gaseous oxidizing agent may be most convenient to use in many circumstances due to the fact that under appropriate reaction conditions, good mixing and contact with the coated carbonaceous particles is easily achievable. By way of non-limiting example, exemplary gaseous oxidizing agents include: oxygen, sulfur fumes, gaseous oxides and halogens. Preferred oxidizing agents include oxygen, nitrogen oxide gas, as well as, under certain conditions, ambient air which of course includes an appreciable proportion of oxygen gas.

With regard to the reaction conditions required, wherein the oxidizing agent is gaseous, again, it is required only that such reaction conditions be appropriate to insure the oxidization of the carbon residue forming material which is present on the carbonaceous particles. Under certain conditions, ambient pressure and temperature may be sufficient, but yet again as described with reference to the other forms of oxidizing agents described previously, it may be advantageous to insure that slightly elevated temperatures and/or pressures i.e., temperatures in the range of between 30° C.-400° C. and/or slightly elevated pressures, i.e., 1-10 atm be established to initiate or maintain the oxidation reaction. Again, it is understood that the appropriate reaction conditions are highly dependant upon the nature of the carbon residue forming material used to coat the carbonaceous particles, the specific gaseous oxidizing agent, as well as the reaction vessel itself. Useful reaction vessels are those which necessarily can contain, or bring into contact, the gaseous oxidizing agent with the coated carbonaceous particles and while many conventional vessels can be used, the use of the fluidized bed reactor is preferred. Utilization of a fluidized bed reactor wherein the gas flow stream comprises the gaseous oxidizing agent is preferred as effective intimate contact between the gaseous oxidizing agent and the coated carbonaceous particles are reliably assured.

According to a further step of the inventive process the stabilized coated carbonaceous particles are subsequently carbonized, and/or graphitized depending on the materials used. When the carbonaceous material used to produce the stabilized coated particles is a high-carbon material such as calcined coke, natural graphite or synthetic graphite, the particles can be directly graphitized without an intervening carbonization step. Additionally, when the carbonaceous material is graphite, useful products are formed by only carbonizing the stabilized, coated particles. When the carbonaceous material is a softer carbon such as green coke or a soft carbon derived from a natural of synthetic polymer, it is preferred to carbonize the stabilized coated particles to a temperature of about 400 to about 2000° C. and then graphitize the particles at a temperature of about 2200° C. or higher.

According to this further step, heating of the coated and stabilized carbonaceous particles takes place under appropriate reaction conditions in order to insure a high degree, or a complete carbonization thereof. With regard to the temperature required to insure carbonization, desirably this is achieved by raising the temperature in a controlled manner from a starting temperature, usually ambient temperature, to the final carbonization temperature which falls within the above-identified range of about about 400 to about 2000° C. and preferably within the range of about 550° C. to about 1500° C.

With regard to the temperature rise, this can vary due to the nature of the reacted coated carbonaceous particles, as well as the reaction conditions and apparatus used. With regard to the apparatus, typically conventional ovens are quite satisfactorily used, although it is preferred that sealed ovens wherein a specific atmosphere can be maintained during the carbonization process are used. Sealed ovens wherein a reduced pressure may be maintained, especially vacuum ovens are particularly advantageous.

With regard to the atmospheric conditions for the carbonization process, the atmosphere may be ambient air up to about 850° C. but an inert atmosphere is preferred at temperatures above about 400° C. Ambient air is an acceptable atmosphere when the oxygen is largely displaced during heating or during heating under vacuum. Suitable inert atmospheres include nitrogen, argon, helium, etc. which are non-reactive with the heated coated carbonaceous particles.

With regard to the temperature conditions, these can vary widely but generally, the rate of temperature rise to which the reacted coated carbonaceous particles are subjected in order to achieve carbonization thereof is on the order of 0.5° C.-20° C./min. Such a controlled temperature rise insures that good carbonization results are achieved. Preferably however the coated carbonaceous particles are heated to a final carbonization temperature gradually, and with at least one intermediate heat treatment step where prior to the final carbonization temperature used in a process, the coated carbonaceous particles are heated to an intermediate temperature, and maintained at that intermediate temperature for an interval of time. The intermediate temperature or the period for which such intermediate temperature is maintained may vary, and will be understood to depend from process to process. It is to be understood that the inclusion of one or more such periods of time during which the particles are maintained at such intermediate temperatures is beneficial in facilitating the polymerization or other ordering of the coating present on the carbonaceous particles. Indeed, the practice of several such intermediate heat treatment steps is further preferred over the practice of a single heat treatment step in that the provision of more than one heat treatment steps in which the coated particles are maintained at a constant temperature is believed to impart improved characteristics to the coated carbonaceous particles over particles which have undergone but one or no such heat treatment step. It is further to be understood that during the heating of the coated carbonaceous particles particular attention must be paid to ensure that neither the temperatures attained during this heating process, nor the rate of the temperature rise during any part of the heating process be such that the instantaneous melting point of the coating upon the carbonaceous particles is exceeded. More simply stated, the thermal degradation of the coating is to be effected by a controlled temperature rise wherein the process temperature is maintained at or below the instantaneous melting point of the coating where said melting point is generally increasing with time during the process. In view of this requirement, preferred heating processes are those which exhibit slower rates of temperature rise. Particular preferred examples of such heat treatment steps are described with reference to one or more of the Examples.

Subsequent to the attainment of the maximum temperature use for the carbonization process, the coated carbonaceous particles having been carbonized may be cooled to ambient temperature, although this is not an essential requirement. Again, the cooling rate is desirably controlled, i.e., to be within about 3° C.-100° C./min. although, this cooling rate has been observed to be typically far less limiting as the rate of temperature rise during the carbonization process.

The most preferred aspects of the invention result in the provision of a smooth coating upon individual carbonaceous particles. Preferably the stabilization of the coating is followed by controlled heating of the coated stabilized particles so as to effect carbonization of the coated particles with little or no clumping or self-adhesion of the individual particles. The desired results are coated particles with little or no broken fracture surfaces of the type which are characteristically form when the separate particles fuse and must be crushed or broken apart in order to provide a free flowing powder. Such fracture surfaces are desirably minimized or avoided as they are believed to contribute to low electrochemical efficiency when the particles are used as an anode material in rechargeable electrical storage cells, particularly in rechargeable lithium ion batteries.

According to a particularly preferred embodiment of the inventive process taught herein, the carbon residue forming material is provided in a fluid form. It has been observed by the inventors that when the carbon residue forming material is precipitated from a liquid, a smooth coating forms at the interface of the individual carbonaceous particles and the surrounding liquid. A smooth coating is retained when subsequently carbonized.

Although less advantageous, when the carbon residue forming coating is supplied as a solid, it is desirably fused on the surface of the carbonaceous particles in order to form a smooth coating thereon.

The stabilization step of the current invention is carried out to render the surface of the coating infusible to the subsequent carbonization step. Oxidative stabilization allows the smooth surface produced in the coating process to be preserved in the final coated particles of the instant invention, as the oxidative stabilization renders the surface of the coating infusible to the subsequent carbonization step.

Heat treatment of the stabilized coated particles is desirably conducted in a controlled maimer in order to minimize fusion of the particles. One skilled in the art will recognize that highly stabilized; infusible coated particles can be heated relatively aggressively and quickly during carbonization. In contrast, relatively mildly stabilized coated particles require slower heating in order to avoid excessive melting of the coating and fusion of the particles. Use of a fluidized bed during stabilization and heat treatment is especially beneficial in preventing clumping and fusion of the coated particles.

Especially preferred embodiments of the present invention produce a free-flowing powder of coated particles after the carbonization and/or graphitization steps, which particles exhibit little or no fusion among the particles, but can generally be broken into a free-flowing powder by simple mechanical agitation, such as by use of a stirring rod, or by rubbing between the thumb and forefinger. Where some fusion may have occurred between particles, and mechanical agitation is used to separate these particles which may result in the formation of new fracture surfaces, in the preferred embodiments of the invention these fracture surfaces do not comprise more than 10%, preferably no more than 2% of the total surface area of the particles. Such are considered as being substantially smooth coatings.

Wile it is preferred that the carbonized coated carbonaceous particles be graphitized before use, graphitization is not essential as the carbonized coated carbonaceous particles produced by the inventive process may be used directly in various applications, including in the formation of electrodes, particularly anodes in batteries, especially in rechargeable batteries.

As is discussed in more detail with reference to the examples following, the use of the materials according as anodes in lithium ion batteries is particularly advantageous.

Preferably however, the carbonized coated carbonaceous particles are also graphitized by heating them to a still higher elevated temperature which is in excess of the temperatures reached during the carbonization step. The advantage of graphitization is many-fold, and most significantly the graphitization process frequently allows for the generation of a more -ordered crystal lattice in the coated carbonaceous particles. A certain improved crystal lattice provides more regular and uniform structure, and is also believed to improve the charge capacity of a battery containing the coated carbonaceous particles described herein. It is especially noteworthy that the graphitized coated particles of this invention show high capacity at a low potential of 0.0 to 0.5 volts. This is highly advantageous in making rechargeable batteries from these materials.

Graphitization also removes impurities. This purification step is especially important when impure carbons such as natural graphite are used as the source of the carbonaceous particles of this invention.

With regard to appropriate graphitization conditions, again these are to be understood to vary according to the specific nature of the carbonized, coated carbonaceous particles, as well as the reaction conditions required to bring about the graphitization. Generally, the same apparatus used for the carbonization step may also be conveniently used, it only being required that such device be capable of further elevating the temperature to a temperature or range of temperatures wherein the effects of graphitization is observed to occur. Typically, graphitization occurs in the temperature range of about 2200° C.-3200° C., although lower or higher temperatures might also be used in this step. It is required only that a satisfactory degree of graphitization be obtained during this step, such that an improved charging capacity is achieved.

With regard to the process conditions it is desired that graphitization is performed in an inert atmosphere such as described previously. Graphitization can immediately follow carbonization, in which case the carbonized coated carbonaceous particles are retained in a reaction apparatus, i.e., an oven, and the temperature is raised up to an appropriate graphitization temperature. With regard to the rate of this temperature rise, desirably this is maintained in the same rate as that used for the carbonization step although, greater or lesser rates of temperature rise can also be utilized depending upon the nature of the carbonized coated carbonaceous particles.

A preferred aspect of the present invention is in the pitch coating process, or carbon-residue-forming material coating process. This coating process provides uniform carbon-residue-forming coating on carbonaceous particles regardless of particle size. The coating can be accomplished in a number of ways but it is especially advantageous to precipitate the coating material in the presence of a suspension of the carbonaceous particles. This coating method yields a uniform coating of controlled composition and produces a loose composite particle powder, so that the pitch-coated particles do not agglomerate and no further milling process is required in the subsequent process steps.

Another preferred aspect of the present invention is in an oxidation reaction which is carried out on the coated particles prior to carbonization of the coating. The oxidation reaction is believed to provide certain technical benefits. First, it is believed that the reacted coated particles are relatively infusible following oxidation, which is particularly desirable in view of subsequent process steps, and subsequent handling of the particles. Second, it is believed that the reacted coated particles are endowed with a surface which yields high efficiency when used as an electrode, particularly when the reacted coated particles are used in an anode material in a rechargeable storage cell, particularly in a rechargeable Li-ion cell.

Another preferred aspect of the present invention is in the graphitization step. The coated carbonaceous particles, also referred to herein as the composite particle powders or coated particle powders, are preferably carbonized/graphitized at temperatures higher than 2200° C. This high temperature heat treatment after the oxidation results in both the very high capacity and charge efficiency for the coated particle powders. It is especially advantageous that nearly all of the high capacity of these graphitized materials occurs at a low potential of 0.0 to 0.5 volts.

A further aspect of the invention contemplates the use of the carbonized and/or graphitized coated carbonaceous particles in electrodes, particularly anodes, of electrical storage cells, particularly in rechargeable batteries. According to this aspect of the invention, there is contemplated a method for the manufacture of an electrical storage cell which comprises the step of: incorporating into an anode of the electrical storage cell coated graphitic materials comprising coated fine carbonaceous particles having a coating layer formed of an oxidized, carbon residue forming material.

According to this aspect of the invention, the coated carbonaceous particles produced from the processes described above are formed using the conventional techniques into electrodes, particularly anodes. While not described with particularity herein, it is contemplated that known-art manufacturing techniques for the assemblage of such electrodes, as well as known-art devices which facilitate in the formation of such electrodes can be used. A particular advantage which is obtained by the use of the coated carbonaceous particles taught herein lies in the fact that due to their coating, they rarely fuse together thus resulting in a flowable powder. Such flowable powder not only facilitates in the transport of the coated carbonaceous materials, but also aids in the ultimate electrode as such provides a good degree of packing and uniformity. Such a good degree of packing of course very favorably impacts on the volumetric capacity of any battery, particularly a rechargeable battery of which these electrodes form a part, as an increased charge carrying capacity per unit volume of the electrode permits for the decrease in the overall size of a battery while maintaining good performance characteristics thereof. Another aspect of the current invention is that the coated carbonaceous particles of this invention have a very high first cycle efficiency. This high efficiency is developed by the process of this invention. First cycle efficiency of the coated carbonaceous particles of this invention are typically >90% when the carbon electrode is electrochemically cycled between 0 and 1 volts versus lithium metal. By comparison, first cycle efficiency is as low as 50% in the carbonaceous particles before coating and is typically 90% or less in coated particles produced by other techniques previously known in the art.

Another aspect of the present invention is an increase in gravimetric or specific capacity as a result of practicing the coating process. Specific capacity is typically increased by 2 to 5% in the graphitized coated particles of this invention.

Aspects of the present invention, including certain preferred embodiments are described in the following Examples of the present invention.

EXAMPLES

Electrochemical Test Procedure

The electrical charge capacity, as well as the irreversible electrical charge capacity loss of the powder particles were evaluated by the following techniques.

Samples of a powder particle (5 g) were first thoroughly mixed with 3.82 grams of a solution containing 0.382 g of polyvinylidene fluoride (PVDF, ex. Aldrich Chemical Co., Inc.) and 3.44 g of 1-methyl-pyrrolidinone (NMP, ex. Aldrich Chemical Co., Inc.) solution to which was also added 0.082 g of acetylene black (having an effective surface area of 80 m$^2$/g, ex. Alfa Aesar) in order to form uniform slurry. This slurry was then manually cast utilizing a doctor blade to form a thin film having a loading of about 10 mg/cm$^2$ onto the rough side of an electrodeposited copper foil (10 μm, ex. Fuduka Metal Foil & Powder Co., Ltd.) The cast film was then dried on a hot plate at approx. 100° C. and pressed to a desired density (approx. 1.4 g/cm$^2$) with a roll press. After the cast film was allowed to cool, a disc having an area of 1.5 cm$^2$ was then punched out from the film and weighed to determine the amount of the graphite powder. Subsequently this disc was further dried under vacuum at a temperature of 80° C. for approximately 15 minutes, and then the disc was transferred into a sealed box without exposing the disc to ambient air. The sealed box was filled with ultra-pure argon gas having oxygen and moisture levels of less than 1 ppm.

Subsequently the disc was used as the anode in the manufacture of a standard coin cell (2025 size) which was used as the test cell. The other electrode of the test cell was a foil of pure lithium (100 μm, ex. Alfa Aesar). A two layer separator was used in the test cell, a glass mat (GF/B Glass Microfibre Filter, Whatman International Ltd.) as the first layer on the carbon electrode side, and a porous polypropylene film (available as Celgard® 2300, ex. Celgard Inc.). as the second layer on the lithium foil. The electrolyte of the test cell was a 1 M LiPF$_6$ in ethylene carbonate (EC)/diethyl carbonate (DEC)/dimethyl carbonate (DMC) solvent mixture (40/30/30) (available as specified by EM Industrial.) Test cells were produced utilizing the component described above according to conventional techniques, although the samples of powder particles were varied to ensure that at least one sample coin cell was produced incorporating a powder particle sample according to either one of the demonstrative examples, or according to one of the comparative examples. These powders were tested as the anode material in a coin cell configuration of carbon/separator/lithium metal at room temperature (approx. 22° C.). Two or three cells were made for each sample, the reported charge capacity and charge efficiency were the average value of the cells.

The capacity and charging efficiency of a specific powder particle sample was determined according to the following protocol. Utilizing a standard electrochemical test station (Model BT-2043, Arbin Instrument Corp.) an assembled test cell was first discharged at 1 mA (approx. 67 mA/g) to 0 volts and held at 0 volts for 2 hours or till current dropped to less than 50 μA whichever occurred first. Thereafter the assembled test cell was charged at 1 mA to 2 volts during which time the charge passed during charging was used to calculate the specific capacity of the graphite powder, while the ratio of the total charge passed during charging to the total charge passed during discharging was used to determine the first cycle efficiency.

Example 1

A carbonaceous powder was prepared as follows. A "green" granular needle coke was first milled with a hammer mill, and subsequently milled into a fine powder with a jet mill. Subsequently, the resultant milled particles of carbonaceous material were classified to remove particles smaller than 1 μm. The resultant carbonaceous powder had particles sized in the range of between 0.5 μm and about 50 μm, and an average particle size of about 15-20 μm.

To a laboratory beaker was provided 4 g of a low melting point petroleum pitch (a210° C. Mettler softening point, 75% Alcor carbon residue, <100 ppm ash isotropic petroleum pitch) in 4 g of Tetralin® ($C_{10}H_{12}$) at 140° C. In a second laboratory beaker was combined 20 g of the carbonaceous powder produced as described above with 700 ml of xylene ($C_6H_4(C_2H_3)_2$) at 120° C. To the contents of the second beaker was gradually added the contents of the first beaker, and following the addition the resultant mixture was heated and maintained at 128° C. for 15 minutes under continuous stirring. Subsequently the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours. Due to the differences in solubility of the pitch in Tetralin® as opposed to the solubility of pitch in a large volume of xylene at different temperatures, selective precipitation of a higher melting point pitch occured on the carbonaceous powder particles. The final weight of the dried coated carbonaceous powder particles was about 21.1 g. The amount of precipitated pitch on the carbonaceous powder was determined from the following equation:

(Final weight−initial weight)/Final Weight=amount of precipitated pitch

Therefore, the amount of precipitated pitch on the carbonaceous powder was established to account for 5 wt % of the total mass of the coated carbonaceous powder particles.

A separate experiment was performed to determine the melting point and carbon residue yield of the coating produced by this Example. An identical solution of isotropic pitch in Tetralin® was added to an identical amount of xylene except that no carbonaceous particles were dispersed in the xylene. The pitch precipitate that formed had a melting point of 310° C. and an Alcor carbon residue of 84%.

Subsequently the coated carbonaceous powder was oxidized by thoroughly mixing the powder with 9 g of 1.5 wt % aqueous solution of sodium nitrate ($NaNO_3$) (A.C.S. reagent, ex. J.T. Baker, Inc.) The mixture was subsequently dried under vacuum at 80° C. and thereafter the dried mixture was transferred to 50 ml alumina crucibles and inserted into a vacuum furnace. The crucibles were then slowly heated under vacuum conditions from about ambient temperature to 325° C. at a rate of 1° C./minute, at which point the crucibles were maintained under vacuum at 325° C. for 2 hours. This slow heating step provided suitable oxidation reaction conditions whereby the deposited coating could be oxidized and stabilized prior to any further processing steps or handling, and permitted the pitch coating to form a better ordered molecular structure. Following this oxidation step, the stabilized coated carbonaceous powder particles could then be carbonized at still higher temperatures with little or no change in their morphology and with little or no likelihood of the melting of the coating layer.

Although the stabilized coated carbonaceous powder particles could be used without further processing, according to preferred embodiments of the invention further process steps were practiced in order to ultimately graphitize the particles.

Following the heat conditioning step at 325° C. for 2 hours, the crucibles containing the stabilized coated carbonaceous powder particles were further heated in argon gas at a rate of 1° C. /minute to a temperature of 350° C. at which point the crucibles were maintained at 350° C. for 2 hours. Thereafter the crucibles containing the stabilized coated carbonaceous powder particles were further heated at a rate of 1° C./minute to a temperature of 410° C. at which point the crucibles were maintained at this higher temperature for 2 hours. Subsequently the crucibles containing the stabilized coated carbonaceous powder particles were further heated at a rate of 5° C./minute to a temperature of 850° C. at which point the crucibles were maintained at 850° C. for 2 hours, after which heating of the oven was discontinued and the contents of the oven were allowed to cool to ambient temperature (approx. 22° C.). Also, it is to be understood that stabilized coated carbonaceous powder particles could be used after one or more heat treatment steps and without further processing, but according to preferred embodiments of the invention the particles are ultimately graphitized.

After the coated carbonaceous powder particles were cooled, they were graphitized by transferring them to a graphite crucible and then introducing the crucible to an induction furnace having an argon atmosphere, and first heating the crucible at a rate of 13° C./minute to a temperature of 2800° C. and thereafter heating the crucibles at a rate of 5° C./minute to 3000° C. at which time the temperature of the induction furnace was maintained at 3000° C. for a period of 45 minutes, after which graphitization was believed to be essentially complete. Subsequently the graphitized coated carbonaceous powder particles were removed from the crucibles.

The resultant powder particles demonstrated good powder flowability, and it did not appear that fusion of particles had taken place. The results of electrochemical testing of the graphite powder of this Example are shown in Table 1 following Comparative Example 2.

Example 2

A further sample of coated carbonaceous powder particles was produced in accordance with the process steps described above with reference to Example 1. According to this example however, initially there was provided to the first laboratory beaker 8.5 g of the low melting point petroleum pitch described in Example 1, which was added to 8.5 g of Tetralin® ($C_{10}H_{12}$) at 140° C. The contents of the second laboratory beaker remained the same as in Example 1, but the resultant dried coated carbonaceous powder particles recovered exhibited a final dried weight of about 22.3 grams. Based on this information, the coating on the coated carbonaceous powder particles was determined to be about 10 wt. % based on the total mass of the coated carbonaceous powder particles. These dried particles were subsequently thoroughly mixed with 9 g of 3.8 wt % aqueous solution of sodium nitrate ($NaNO_3$) (A.C.S. reagent, ex. J.T. Baker, Inc.) The mixture was subsequently dried under vacuum at 80° C. The dried mixture was subsequently oxidized, and heat treated in accordance with the steps described in Example 1, until graphitized coated carbonaceous powder particles were obtained. The graphitized powder particles of Example 2 demonstrated good powder flowability, and it did not appear that fusion of particles had taken place. The results of electrochemical testing of the graphite powder of this Example are shown in Table 1 following Comparative Example 2.

Example 3

A further sample of coated carbonaceous powder particles was produced in accordance with the process steps described above with reference to Example 1. According to this example however there was provided 10 g of the low melting point petroleum pitch described in Example 1, which was added to 10 g of Tetralin® ($C_{10}H_{12}$) at 140° C. in the first laboratory beaker. The contents of the second laboratory beaker remained the same as in Example 1, but the resultant dried coated carbonaceous powder particles recovered exhibited a final dried weight of about 22.7 grams. Based on this information, the coating on the coated carbonaceous powder particles was determined to be about 12 wt. % based on the total mass of the coated carbonaceous powder particles. These dried particles were then subsequently thoroughly mixed with 9 g of 4.5 wt % aqueous solution of sodium nitrate ($NaNO_3$) (A.C.S. reagent, ex. J.T. Baker, Inc.) The mixture was subsequently dried under vacuum at 80° C. The dried mixture was subsequently oxidized, and heat treated in accordance with the steps described in Example 1, until graphitized coated carbonaceous powder particles were obtained. The resultant powder particles demonstrated good powder flowability, and it did not appear that fusion of particles had taken place. The results of electrochemical testing of the graphite powder of this Example are shown in Table 1 following Comparative Example 2.

Example 4

A further sample of coated carbonaceous powder particles was produced in accordance with the process steps described above with reference to Example 1. According to this example however, to the first laboratory beaker was provided 15 g of the low melting point petroleum pitch of Example 1, and 15 g of Tetralin® ($C_{10}H_{12}$) at 140° C. The contents of the second laboratory beaker remained the same as in Example 1, but the resultant dried coated carbonaceous powder particles recovered exhibited a final dried weight of about 24 grams. Based on this information, the coating on the coated carbonaceous powder particles was determined to be about 17 wt. % based on the total mass of the coated carbonaceous powder particles. These dried particles were then subsequently thoroughly mixed with 10 g of 6.0 wt % aqueous solution of sodium nitrate ($NaNO_3$) (A.C.S. reagent, ex. J.T. Baker, Inc.) The mixture was subsequently dried under vacuum at 80° C. The dried mixture was subsequently oxidized, and heat treated in accordance with the steps described in Example 1, until graphitized coated carbonaceous powder particles were obtained. The resultant powder particles demonstrated good powder flowability, and it did not appear that fusion of particles had taken place. The results of electrochemical testing of the graphite powder of this Example are shown in Table 1 following Comparative Example 2.

Example 5

A further sample of coated carbonaceous powder particles was produced in accordance with the process steps described above with reference to Example 1. According to this example however, to the first laboratory beaker was provided 20 g of the low melting point petroleum pitch of Example 1, and 20 g of Tetralin® ($C_{10}H_{12}$) at 140° C. The contents of the second laboratory beaker remained the same as in Example 1, but the resultant dried coated carbonaceous powder particles recovered exhibited a final dried weight of about 25.3 grams. Based on this information, the coating on the coated carbonaceous powder particles was determined to be about 21 wt. % based on the total mass of the coated carbonaceous powder particles: These dried particles were then subsequently thoroughly mixed with 10 g of 8 wt % aqueous solution of sodium nitrate ($NaNO_3$) (A.C.S. reagent, ex. J.T. Baker, Inc.) The mixture was subsequently dried under vacuum at 80° C. The dried mixture was subsequently oxidized, and heat treated in accordance with the steps described in Example 1, until graphitized coated carbonaceous powder particles were obtained. The resultant powder particles demonstrated good powder flowability, and it did not appear that fusion of particles had taken place. The results of electrochemical testing of the graphite powder of this Example are shown in Table 1 following Comparative Example 2.

Comparative Example 1

As a comparative example, the same milled green needle coke carbonaceous powder of Example 1 was graphitized and tested as an anode carbon in a lithium ion battery. This comparative example demonstrated the use of uncoated graphitized carbonaceous powder particles.

Graphitization of these uncoated carbonaceous powder particles was achieved by transferring them to a graphite crucible, inserting the crucible into an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucibles containing the uncoated carbonaceous powder particles was then allowed to cool to ambient temperature, after which the powder particles were removed from the crucibles. The resultant uncoated powder particles demonstrated good powder flowability. The results of electrochemical testing of the graphite powder of this Comparative Example are shown in Table 1 following Comparative Example 2.

Comparative Example 2

As a further comparison example there were utilized 20 grams of "as-milled" uncoated "green" carbonaceous particles, which were mixed in a laboratory beaker with 9 g of a 1.5 wt % aqueous solution of sodium nitrate ($NaNO_3$) (A.C.S. reagent, ex. J.T. Baker, Inc.) The mixture was subsequently dried under vacuum at 80° C. and thereafter the dried mixture was then provided to alumina crucibles and inserted into a vacuum furnace. These samples were subsequently subjected to the same heat treatment steps as outlined in Example 1, namely, heated under vacuum conditions from about ambient temperature to 325° C. at a rate of 1° C./minute, and thereafter maintained under vacuum at 325° C. for 2 hours. Next, the particles were further heated under argon at a rate of 1° C./minute to 350° C., and thereafter maintained at 350° C. for 2 hours and subsequently heated at a rate of 1° C./minute to a temperature of 410° C. and thereafter maintained under vacuum for 2 hours. Subsequently the crucibles containing these uncoated carbonaceous powder were further heated under argon at a rate of 5° C./minute to a temperature of 850° C. and then maintained at 850° C. for 2 hours, after which heating was discontinued, the contents of the oven were allowed to cool to ambient temperature (approx. 20° C.).

Graphitization of these uncoated carbonaceous powder particles was achieved by the same process described above with reference to Comparative Ex. 1. Again, the resultant uncoated powder particles demonstrated good powder flowability. The results of electrochemical testing of the graphite powder of this Comparative Example are shown in Table 1 below.

Table 1 reports the results for the seven samples of powder particles prepared according to each of Examples 1-5 and Comparative Examples 1-2 as determined using the Electrical Test Procedure described at the beginning of the Examples.

TABLE 1

| | Coated pitch (%) | Capacity (mAh/g) | Irreversible capacity loss (mAh/g) | Efficiency (%) |
|---|---|---|---|---|
| Comp. 1 | 0 | 314 | 301 | 51 |
| Comp. 2 | 0 | 304 | 249 | 55 |
| Ex. 1 | 5 | 322 | 166 | 66 |
| Ex. 2 | 10 | 337 | 14 | 96 |
| Ex. 3 | 12 | 330 | 14 | 96 |
| Ex. 4 | 17 | 322 | 13 | 96 |
| Ex. 5 | 21 | 318 | 13 | 96 |

It can be seen that the first cycle efficiency was greatly improved from 50% to 96% when the amount of coated pitch was increased to 10 wt %. The results also show that the efficiency does not increase farther when it reaches about 96%. In addition, the materials treated according to this invention yield a higher capacity than those that were not treated.

Example 6

A further sample of coated carbonaceous powder particles according to the invention was produced utilizing a commercially available milled natural graphite powder having particles sized less than 44 µm. (available as KS-44, ex. Lonza). To a first laboratory beaker was provided 8.5 g of a low melting point petroleum pitch (a 210° C. Mettler softening point, 75% Alcor carbon residue, <100 ppm ash isotropic petroleum pitch.) in 10 g of Tetralin® ($C_{10}H_{12}$) at 140° C. A sample of 20 grams of the milled natural graphite powder particles were provided to a second laboratory beaker which contained 700 ml of xylene ($C_6H_4(C_2H_3)_2$) at 120° C. To the contents of the second beaker was gradually added the contents of the first beaker, and following the addition the resultant mixture was heated and maintained at 128° C. for 15 minutes under continuous stirring. Thereafter the heat source was removed, and while the continuous stirring was maintained the mixture was allowed to cool to ambient temperature (approx. 20° C.). The resultant solids were removed from the cooled mixture by first filtering the mixture on a vacuum fuunel, and thereafter drying under vacuum at 120° C. for at least 3 hours. As discussed in Example 1, due to the differences in solubility of the pitch in Tetralin® as opposed to the solubility of pitch in xylene at different temperatures, selective precipitation resulted in precipitation and deposition of higher melting point pitch on the carbonaceous powder particles. The final weight of the dried coated carbonaceous powder particles was determined to be about 22.3 g, while the amount of precipitated pitch on the carbonaceous powder was determined to be 10 wt. % of the total mass of the coated carbonaceous powder particles.

Subsequently the dried coated carbonaceous powder particles were thoroughly mixed with 9 g of 3.8 wt % aqueous solution of sodium nitrate ($NaNO_3$) (A.C.S. reagent, ex. J.T. Baker, Inc.) The mixture was subsequently dried under vacuum at 80° C. The dried mixture was subsequently subjected to the same heat treatment steps as outlined in Example 1, namely, heated under vacuum conditions from about ambient temperature to 325° C. at a rate of 1° C./minute, and thereafter maintained under vacuum at 325° C. for 2 hours. Next, the particles were further heated under argon at a rate of 1° C./minute to 350° C., and thereafter maintained at 350° C. for 2 hours and subsequently heated at a rate of 1° C./minute to a temperature of 410° C. and thereafter maintained for 2 hours. Subsequently the crucibles containing the coated carbonaceous powder were further heated at a rate of 5° C./minute to a temperature of 850° C. and then maintained at 850° C. for 2 hours, after which heating was discontinued and the contents of the oven were allowed to cool to ambient temperature (approx. 22° C.).

Graphitization of these coated carbonaceous powder particles was achieved by transferring them to a graphite crucible, inserting the crucible into an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucible containing the coated carbonaceous powder particles was then allowed to cool to ambient temperature (approx. 22° C.), after which the powder particles were removed from the crucible. The resultant powder particles exhibited good flowability. The results of electrochemical testing of the graphite powder of this Example are shown in Table 2 following Comparative Example 5.

Example 7

A further sample of coated carbonaceous powder particles according to the invention was produced utilizing particles derived from a calcined petroleum needle coke (calcining temperature 1100° C.) having particles sized in the range of between 1 µm and about 50 µm, and an average particle size of about 20 µm. Similarly to the process described in Example 6, to a first laboratory beaker was provided 8.5 g of a low melting point petroleum pitch (a 210° C. Mettler softening point, 75% Alcor carbon residue, <100 ppm ash isotropic petroleum pitch.) in 8.5 g of Tetralin® ($C_{10}H_{12}$) at 140° C. A sample of 20 grams of the milled calcined petroleum coke powder particles were provided to a second laboratory beaker which contained 700 ml of xylene ($C_6H_4(C_2H_3)_2$) at 120° C. To the contents of the second beaker was gradually added the contents of the first beaker, and following the addition the resultant mixture was heated and maintained at 128° C. for 15 minutes under continuous stirring. Thereafter the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours. As discussed in Example 1, due to the differences in solubility of the pitch in Tetralin® as opposed to the solubility of pitch in xylene at different temperatures, selective precipitation resulted in precipitation and deposition of higher melting point pitch on the carbonaceous powder particles. The final weight of the dried coated carbonaceous powder particles was determined to be about 22.3 g, while the amount of precipitated pitch on the carbonaceous powder was determined to be 10 wt. % of the total mass of the coated carbonaceous powder particles.

Subsequently the dried coated carbonaceous powder particles were thoroughly mixed with 9 g of 3.8 wt % aqueous solution of sodium nitrate ($NaNO_3$) (A.C.S. reagent, ex. J.T. Baker, Inc.) The mixture was subsequently dried under vacuum at 80° C. The dried mixture was subsequently were subjected to the same stabilization, carbonization and graphitization steps as outlined in Example 6., The resultant powder particles exhibited good flowability. The results of electrochemical testing of the graphite powder of this Example are shown in Table 2 following Comparative Example 5.

Example 8

Coated carbonaceous powder particles were produced utilizing a milled "green" petroleum needle coke having particles sized in the range of between 1 µm and about 50 µm, and an average particle size of about 20 µm. Similarly to the process described in Example 6, to a first laboratory beaker was provided 10 g of a low melting point petroleum pitch (a 210° C. Mettler softening point, 75% Alcor carbon residue, <100 ppm ash isotropic petroleum pitch.) in 10 g of Tetralin® ($C_{10}H_{12}$) at 140° C. A sample of 20 grams of the milled natural graphite powder particles were provided to a second laboratory beaker which contained 700 ml of xylene ($C_6H_4(C_2H_3)_2$) at 120° C. To the contents of the second beaker was gradually added the contents of the first beaker, and following the addition the resultant mixture was heated and maintained at 128° C. for 15 minutes under continuous stirring. Thereafter the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours. As discussed in Example 1, due to the differences in solubility of the pitch in Tetralin® as opposed to the solubility of pitch in xylene at different temperatures, selective precipitation resulted in precipitation and deposition of higher melting point pitch on the carbonaceous powder particles. The final weight of the dried coated carbonaceous powder particles was determined to be about 23 g, while the amount of precipitated pitch on the carbonaceous powder was determined to be 13 wt. % of the total mass of the coated carbonaceous powder particles.

Subsequently the dried coated carbonaceous powder particles were thoroughly mixed with 9 g of 4.5 wt % aqueous solution of sodium nitrate (NaNO$_3$) (A.C.S. reagent, ex. J.T. Baker, Inc.) The mixture was subsequently dried under vacuum at 80° C. The dried mixture was subsequently subjected to the same heat treatment steps as outlined in Example 6, including the final graphitization process. The resultant powder particles exhibited good flowability. The results of electrochemical testing of the graphite powder of this Example are shown in Table 2 following Comparative Example 5.

Comparative Example 3

For comparative purposes a sample of the commercially available milled synthetic graphite powder as described in Example 6 was also evaluated for their electrical performance characteristics utilizing the procedure described above under the heading "Electrochemical Test Procedure". The sample of the available milled synthetic graphite powder was used as obtained, and was not coated according to the present inventive process. The results of the electrical performance evaluation are described on Table 2, following.

Comparative Example 4

For comparative purposes a sample of milled calcined petroleum needle coke as described in Example 7 was also evaluated for its electrical performance characteristics utilizing the procedure described above under the heading "Electrochemical Test Procedure". The sample of the available milled calcined coke was used as obtained and was not coated according to the present inventive process, but was subjected to the same heat treatment steps as outlined in Example 6. The results of the electrical performance evaluation are described on Table 2, following.

Comparative Example 5

For comparative purposes a sample of milled "green" needle coke as described in Example 8 were also evaluated for its electrical performance characteristics utilizing the procedure described above under the heading "Electrochemical Test Procedure". The sample of the available milled "green" coke was used as obtained, and was not coated according to the present inventive process, but was subjected to the same heat treatment steps as outlined in Example 6. The results of the electrical performance evaluation are described on Table 2, following.

TABLE 2

| | Coated pitch (%) | Capacity (mAh/g) | Irreversible capacity loss (mAh/g) | Efficiency (%) |
|---|---|---|---|---|
| Ex. 6 | 10 | 344 | 22 | 94 |
| Ex. 7 | 10 | 333 | 14 | 96 |
| Ex. 8 | 13 | 341 | 14 | 96 |
| Comp. Ex. 3 | 0 | 353 | 48 | 88 |
| Comp. Ex. 4 | 0 | 304 | 386 | 44 |
| Comp. Ex. 5 | 0 | 304 | 403 | 43 |

As is readily seen from the results reported in Table 2, the compositions according to the invention (Examples 6, 7 and 8) exhibited a high efficiency (>94%). The Comparison Examples, consisting of the same materials which were not coated according to this invention, exhibited a much lower efficiency than the same materials coated according to the invention, as well as exhibiting a higher irreversible capacity loss.

Example 9

A further sample of coated carbonaceous powder particles according to the invention was produced according to an alternate technique for providing the coating to the particles.

In a laboratory beaker was provided 20 g of the low melting point petroleum pitch (a 210° C. Mettler softening point, 75% Alcor carbon residue, <100 ppm ash isotropic petroleum pitch.) to 80 grams of 1-methyl-pyrrolidinone (NMP, ex. Aldrich Chemical Co., Inc.) to form a 20 wt. % solution of the petroleum pitch. The solution was heated to approx. 60° C. under stirring, at which time 20 g of the milled "green" needle coke particles of Example 8 were introduced, and the contents of the beakers were stirred for a further 15 minutes to ensure homogeneity. Subsequently, resultant solids were removed from the mixture by first filtering the mixture utilizing a vacuum funnel, and thereafter drying under vacuum at 100° C. for at least 5 hours. The final weight of the dried coated carbonaceous powder particles was determined to be about 23.5 g, and the amount of precipitated pitch on the carbonaceous powder was determined to be 15 wt. % of the total mass of the coated carbonaceous powder particles.

The dried coated carbonaceous powder particles were next thoroughly mixed with 12 g of 3 wt % aqueous solution of sodium nitrate (NaNO$_3$) (A.C.S. reagent, ex. J.T. Baker, Inc.) The mixture was subsequently dried under vacuum at 80° C. and thereafter the dried mixture was then provided to 50 ml alumina crucibles and inserted into a vacuum furnace. Thereafter the coated carbonaceous powder particles were subjected to the same heat treatment steps as described in Example 1, and ultimately graphitized coated carbonaceous powder particles were produced.

The electrical charge capacity, as well as the irreversible electrical charge capacity loss of the powder particles were evaluated according to the procedure described above under the heading "Electrochemical Test Procedure". The results of the electrical performance evaluation are described on Table 3, following.

TABLE 3

| | Coated pitch (%) | Capacity (mAh/g) | Irreversible capacity loss (mAh/g) | Efficiency (%) |
|---|---|---|---|---|
| Ex. 9 | 15 | 339 | 29 | 92 |

Example 10

A further sample of coated carbonaceous powder particles according to the invention was produced according to an alternate technique for providing the coating to the particles.

In a laboratory beaker was provided 20 g of the low melting point petroleum pitch (a 210° C. Mettler softening point, 75% Alcor carbon residue, <100 ppm ash isotropic petroleum pitch.) to 80 g (?) of 1-methyl-pyrrolidinone (NW, ex. Aldrich Chemical Co., Inc.) to form a 20 wt. % solution of the petroleum pitch. The solution was heated to approx. 60° C. under stirring, at which time 20 g of a calcined petroleum needle coke (calcining temperature 1100° C.) as used in Example 7 was introduced, and the contents of the beaker was stirred for a further 15 minutes to ensure homogeneity. Subsequently, resultant solids were removed from the mixture by first filtering the mixture utilizing a vacuum funnel, and thereafter drying under vacuum at 100° C. for at least 5 hours. The final weight of the dried coated carbonaceous powder particles was determined to be about 21 g, while the amount of precipitated pitch on the carbonaceous powder was determined to be 5 wt. % of the total mass of the coated carbonaceous powder particles.

The dried coated carbonaceous powder particles were next thoroughly mixed with 11 g of 3 wt % aqueous solution of sodium nitrate ($NaNO_3$) (A.C.S. reagent, ex. J.T. Baker, Inc.) The mixture was subsequently dried under vacuum at 80° C. and thereafter the dried mixture was then provided to alumina crucibles and inserted into a vacuum furnace. Thereafter the coated carbonaceous powder particles were subjected to the same heat treatment steps as described in Example 1, and ultimately graphitized coated carbonaceous powder particles were produced.

The electrical charge capacity, as well as the irreversible electrical charge capacity loss of the powder particles were evaluated according to the procedure described above under the heading "Electrochemical Test Procedure". The results of the electrical performance evaluation are described on Table 4, following.

TABLE 4

| | Coated pitch (%) | Capacity (mAh/g) | Irreversible capacity loss (mAh/g) | Efficiency (%) |
|---|---|---|---|---|
| x.10 | 5 | 343 | 22 | 94 |

As this example illustrated, a pitch coating level as little as 5 wt % on coke fine powder or coated carbon residue as little as 4 wt % still significantly suppresses the irreversible capacity loss according to this invention.

Example 11

A sample of coated carbonaceous powder particles according to the invention was produced demonstrating the use of lignin as the fusible, carbon residue forming material coating for carbonaceous powder particles. Additionally this example demonstrates a one-step coating and oxidation process.

In a laboratory beaker 2.0 g of lignin (Alkali Kraft, ex Aldrich Chemicals Co. Inc.) and 0.3 g of sodium nitrate ($NaNO_3$) were mixed in 9 g of 1 M KOH aqueous solution. This lignin has a carbon residue of about 47% and melting point of 300° C. Subsequently to the laboratory beaker was provided 20 g of the milled "green" granular needle coke particles as used in Example 1, and the contents of the laboratory beaker were thoroughly mixed with a commercial laboratory blender (Waring Model 51BL31). The mixture was removed from the laboratory blender and dried at 80° C. under vacuum for 12 hours. The final weight of the dried coated carbonaceous powder particles was determined to be about 22.4 g, while the amount of precipitated pitch on the carbonaceous powder was determined to be 10 wt % of the total mass of the coated carbonaceous powder particles.

Subsequently the dried coated carbonaceous powder particles were subjected to the same heat treatment steps as described in Example 1, and ultimately graphitized coated carbonaceous powder particles were produced.

The electrical charge capacity, as well as the irreversible electrical charge capacity loss of the powder particles were evaluated according to the procedure described above under the heading "Electrochemical Test Procedure". The results of the electrical performance evaluation are described on Table 5, following.

TABLE 5

| | Coated lignin (%) | Capacity (mAh/g) | Irreversible capacity loss (mAh/g) | Efficiency (%) |
|---|---|---|---|---|
| x.11 | 10 | 330 | 21 | 94 |

The efficiency of the composition according to Example 11 demonstrates a significant and surprising improvement over the results reported for Comparative Example 5 on Table 2, demonstrating the surprising improvements achieved by the practice of the present invention.

Example 12

A sample of coated carbonaceous powder particles according to the invention was produced demonstrating the use of table sugar as the fusible, carbon residue forming material coating for carbonaceous powder particles. This sugar has a carbon residue of about 25%.

In a laboratory 3 grams of table white sugar (House Recipe®, distributed by Sysco Corporation) and 0.3 gram of sodium nitrate ($NaNO_3$) were dissolved in 9 grams of deionized water. Subsequently to the laboratory beaker was provided 20 g of the milled "green" granular needle coke particles as used in Example 1, and the contents of the laboratory beaker were thoroughly mixed with a commercial laboratory blender (Waring Model 51BL31). Thereafter the mixture was removed from the laboratory beaker and dried under vacuum at 80° C. for 3 hours. The amount of coated sugar on the coke particles was determined to be about 13 wt %.

Subsequently the dried coated carbonaceous powder particles were subjected to the same stabilization, carbonization and graphitization steps as described in Example 1, and ultimately graphitized coated carbonaceous powder particles were produced.

The electrical charge capacity, as well as the irreversible electrical charge capacity loss of the powder particles were evaluated according to the procedure described above under the heading "Electrochemical Test Procedure". The results of the electrical performance evaluation are described on Table 6, following.

TABLE 6

| | Coated sugar (%) | Capacity (mAh/g) | Irreversible capacity loss (mAh/g) | Efficiency (%) |
|---|---|---|---|---|
| x.12 | 13 | 303 | 23 | 93 |

Example 13

A sample of coated carbonaceous powder particles according to the invention was produced demonstrating the use of ambient air as the oxidizing agent for the fusible, carbon residue forming material coating of carbonaceous powder particles.

To a laboratory beaker was provided 8.5 g of the low melting point petroleum pitch (a 210° C. Mettler softening point, 75% Alcor carbon residue, <100 ppm ash isotropic petroleum pitch described in Example 1) in 8.5 g of Tetralin® ($C_{10}H_{12}$) at 140° C. In a second laboratory beaker was combined 20 g of the carbonaceous powder produced and as described with reference to Example 1 with 700 ml of xylene ($C_6H_4(C_2H_3)_2$) at 120° C. To the contents of the second beaker was gradually added the contents of the first beaker, and following the addition the resultant mixture was heated and maintained at about 128° C. for 15 minutes under continuous stirring. Subsequently the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours.

The dried powder weighed 22.3 g. The amount of precipitated pitch on the carbonaceous powder was determined to account for 10 wt. % of the total mass of the coated carbonaceous powder particles.

Thereafter the coated carbonaceous powder particles were placed in a laboratory scale fluidized bed reactor and heated from ambient temperature at a heating rate of 10° C./minute to 275° C. and held for 30 minutes at 275° C. while the coated carbonaceous powder particles were fluidized using air as the fluidizing gas. Subsequently the reacted powder particles were transferred into a tube furnace (Linberg/Blue M) and carbonized in pure argon gas and heated from the ambient at a heating rate of 5° C./minute to 850° C., and once this temperature was reached, the coated carbonaceous powder particles were maintained at this temperature for 2 hours. The coated carbonaceous powder particles were subsequently withdrawn and allowed to cool.

Graphitization of the coated carbonaceous powder particles was achieved by next transferring them to a graphite crucible, inserting the crucible into an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucible containing the coated carbonaceous powder particles was then allowed to cool to ambient temperature, after which the powder particles were removed from the crucible. The resultant powder particles demonstrated good powder flowability, and it did not appear that fusion of particles had taken place.

The electrical charge capacity, as well as the irreversible electrical charge capacity loss of the powder particles were evaluated according to the procedure described above under the heading "Electrochemical Test Procedure". The results of the electrical performance evaluation are described on Table 7, following.

TABLE 7

| | Coated pitch (%) | Capacity (mAh/g) | Irreversible capacity loss (mAh/g) | Efficiency (%) |
|---|---|---|---|---|
| x.13 | 10 | 330 | 14 | 96 |

Example 14

A further sample of coated carbonaceous powder particles according to the invention was produced demonstrating the use of ambient air as the oxidizing agent for the fusible, carbon residue forming material coating of carbonaceous powder particles.

In a laboratory beaker was provided 20 g of the low melting point petroleum pitch (aa 210° C. Mettler softening point, 75% Alcor carbon residue, <100 ppm ash isotropic petroleum pitch.) to 80 g of 1-methyl-pyrrolidinone (NMP, ex. Aldrich Chemical Co., Inc.) to form a 20 wt. % solution of the petroleum pitch. The solution was heated to approx. 60° C. under stirring, at which time 20 g of a calcined needle coke petroleum coke (calcining temperature 1100° C.) as described in Example 7 was introduced, and the contents of the beaker were stirred for a further 15 minutes to ensure homogeneity. Subsequently, resultant solids were removed from the mixture by first filtering the mixture utilizing a vacuum funnel, and thereafter drying under vacuum at 100° C. for at least 5 hours. The final weight of the dried coated carbonaceous powder particles was determined to be about 21.5 g, while the amount of precipitated pitch on the carbonaceous powder was determined to be 7 wt % of the total mass of the coated carbonaceous powder particles.

Thereafter the coated carbonaceous powder particles were placed in a fluidized bed reactor as described in Example 13 and heated from ambient temperature at a heating rate of 10° C./minute to 275° C. and held for 30 minutes at 275° C. while the coated carbonaceous powder particles were fluidized using air as the fluidizing gas. Subsequently the reacted powder particles were transferred into a tube furnace as described in Example 13 and carbonized in pure argon gas and heated from the ambient at a heating rate of 5° C./minute to 850° C., and once this temperature was reached, the coated carbonaceous powder particles were maintained at this temperature for 2 hours. The coated carbonaceous powder particles were subsequently withdrawn and allowed to cool.

Graphitization of these coated carbonaceous powder particles was achieved by next transferring them to a graphite crucible, inserting the crucible to an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucible containing the uncoated carbonaceous powder particles was then allowed to cool to ambient temperature, after which the powder particles were removed from the crucible.

The electrical charge capacity, as well as the irreversible electrical charge capacity loss of the powder particles were evaluated according to the procedure described above under the heading "Electrochemical Test Procedure". The results of the electrical performance evaluation are described on Table 8, following.

TABLE 8

|  | Coated pitch (%) | Capacity (mAh/g) | Irreversible capacity loss (mAh/g) | Efficiency (%) |
|---|---|---|---|---|
| x.14 | 7 | 334 | 29 | 92 |

Comparative Example 6

For comparative purposes samples of coated carbonaceous powder particles that were not subjected to an oxidation reaction step were prepared by the following protocol.

To a laboratory beaker was provided 8.5 g of the low melting point petroleum pitch (a 210° C. Mettler softening point, 75% Alcor carbon residue, <100 ppm ash isotropic petroleum pitch as described in Example 1) into 8.5 g of Tetralin® ($C_{10}H_{12}$) at 140° C. In a second laboratory beaker was combined 20 g of the carbonaceous powder produced and as described with reference to Example 1 with 700 ml of xylene ($C_6H_4(C_2H_3)_2$) at 120° C. To the contents of the second beaker was gradually added the contents of the first beaker, and following the addition the resultant mixture was heated and maintained at about 128° C. for 15 minutes under continuous stirring. Subsequently the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours.

The amount of precipitated pitch on the carbonaceous powder was determined to account for 10 wt. % of the total mass of the coated carbonaceous powder particles.

Thereafter the coated carbonaceous powder particles were heated in pure argon gas from ambient temperature according to the following protocol: a first heating rate of 5° C./minute to 200° C. and held at that temperature for 30 minutes, followed by a second heating rate of 2° C./minute to 350° C. and held at that temperature for 2 hours, next heated at a third heating rate of 5° C./minute to 850° C. and held at that temperature for 2 hours and finally, cooling the coated carbonaceous powder particles at a rate of 5° C./minute to ambient temperature(approx. 22° C.) The recovered carbonaceous powder particles were observed to have conglomerated into a single cake, which was withdrawn from the crucible and first crushed into smaller pieces and then ball milled into a powder form.

Graphitization of these coated carbonaceous powder particles was achieved by next transferring them to a graphite crucible, inserting the crucible into an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucible containing the carbonaceous powder particles was then allowed to cool to ambient temperature, after which the powder particles were removed from the crucible.

The electrical charge capacity, as well as the irreversible electrical charge capacity loss of the powder particles was evaluated according to the procedure described above under the heading "Electrochemical Test Procedure". The results of the electrical performance evaluation are described on Table 9, following.

TABLE 9

|  | Coated pitch (%) | Capacity (mAh/g) | Irreversible capacity loss (mAh/g) | Efficiency (%) |
|---|---|---|---|---|
| omp. Ex. 6 | 10 | 300 | 352 | 46 |

As can be understood from these results, particularly in comparison with the results reported on Tables 7 and 8, pitch coated carbonaceous powder particles that had not been oxidized, but were carbonized in an inert atmosphere resulted in poor electrical charge capacity and poor charge efficiency.

Comparative Example 7

For further comparison, samples of coated carbonaceous powder particles that were not subjected to an oxidation reaction step were prepared by protocol similar to that used to produce the compositions of Comparative Example 6. The comparison samples according to the instant Comparative Example differed in that the coated carbonaceous powder particles were prepared in the same manner as illustrated in Example 10 except that they were not oxidized. After carbonization, it was observed that the carbonaceous powder particles had conglomerated into a single cake. The carbon powder clump then was withdrawn from the crucible and first crushed into smaller pieces and then ball milled into a powder form before graphitization.

As in the prior Comparative Example's evaluation, the electrical charge capacity, as well as the irreversible electrical charge capacity loss of the powder particles according to the present Comparative Example were evaluated according to the procedure described above under the heading "Electrochemical Test Procedure". The results of the electrical performance evaluation are described on Table 10, following.

TABLE 10

|  | Coated pitch (%) | Capacity (mAh/g) | Irreversible capacity loss (mAh/g) | Efficiency (%) |
|---|---|---|---|---|
| omp. Ex. 7 | 5 | 317 | 106 | 75 |

The increased electrochemical efficiency resulting from oxidation can be understood from these results, particularly when Examples 10, 13 and 14, where the coated particles were oxidized prior to carbonization according to the invention, are compared with Comparative Examples 6 and 7, where the coated particles were not oxidized.

Example 15

A further sample of coated carbonaceous powder particles according to the invention was produced demonstrating the use of a liquid oxidizing agent for the fusible, carbon residue forming material coating of carbonaceous powder particles.

To a laboratory beaker was provided 8.5 g of the low melting point petroleum pitch (a 210° C. Mettler softening point, 75% Alcor carbon residue, <100 ppm ash isotropic petroleum pitch as described in Example 1) in 8.5 g of Tetralin® ($C_{10}H_{12}$) at 140° C. In a second laboratory beaker was combined 20 g of the carbonaceous powder produced and as described with reference to Example 1 with 700 ml of xylene ($C_6H_4(C_2H_3)_2$) at 120° C. To the contents of the second beaker was gradually added the contents of the first beaker, and following the addition the resultant mixture was heated and maintained at about 128° C. for 15 minutes under continuous stirring. Subsequently the heat source was removed, and while the continuous stirring was maintained the mixture was allowed to cool to ambient temperature (approx. 22° C.). The resultant solids were removed from the cooled mixture by first filtering the mixture on a vacuum funnel, and thereafter drying under vacuum at 120° C. for at least 3 hours. The resultant dried coated carbonaceous powder particles recovered exhibited a final dried weight of about 22.3 grains. The amount of precipitated pitch on the carbonaceous powder was determined to account for 10 wt. % of the total mass of the coated carbonaceous powder particles.

Next the dried pitch-coated powder was poured into a third beaker containing a 35 wt. % aqueous solution of nitric acid ($HNO_3$) at 60° C., and the resulting mixture was maintained at this temperature while stirring. Thereafter the solids were recovered by first filtering the mixture on a vacuum funnel, thoroughly washing the filtered solids with deionized water and thereafter drying under vacuum at 80° C. for at least 5 hours.

Subsequently the recovered coated carbonaceous powder particles were introduced into alumina crucible and were heated in an argon atmosphere from ambient temperature at a first rate of 5° C./minute to a temperature of 850° C. at which point the crucibles were maintained at that temperature for 2 hours, after which the crucibles were allowed to cool at the rate of 5° C./minute to ambient temperature (approx. 22° C.), at which point the coated carbonaceous powder particles were removed from the crucibles. The resultant powder particles demonstrated good powder flowability, and it did not appear that fusion of particles had taken place.

Thereafter the coated carbonaceous powder particles were graphitized by providing them to a graphite crucible, inserting the crucible to an induction furnace having an argon atmosphere, and first heating the crucible at a rate of 13° C./minute to a temperature of 2800° C. and thereafter heating the crucible at a rate of 5° C./minute to 3000° C. at which time the temperature of the induction furnace was maintained at 3000° C. for a period of 45 minutes. Subsequent to these heating steps graphitization was believed to be essentially complete. The crucible containing the coated carbonaceous powder particles was then allowed to cool to ambient temperature, after which the powder particles were removed from the crucible. The resultant powder particles demonstrated good powder flowability, and it did not appear that fusion of particles had taken place.

The electrical charge capacity, as well as the irreversible electrical charge capacity loss of the powder particles were evaluated according to the procedure described above under the heading "Electrochemical Test Procedure". The results of the electrical performance evaluation are described on Table 11, following.

TABLE 11

| | Coated pitch (%) | Capacity (mAh/g) | Irreversible capacity loss (mAh/g) | Efficiency (%) |
|---|---|---|---|---|
| x.15 | 10 | 330 | 14 | 96 |

Example 16

Further samples of coated carbonaceous powder particles according to the invention were produced which also utilized a liquid oxidizing agent as was used in Example 15. The dried pitch-coated powder was prepared as described in Example 14 and was oxidized in a nitric acid solution as described in Example 15 before carbonization and graphitization.

As in the prior Example's evaluation, the electrical charge capacity, as well as the irreversible electrical charge capacity loss of the powder particles according to the present Example were evaluated according to the procedure described above under the heading "Electrochemical Test Procedure". The results of the electrical performance evaluation are described on Table 12, following.

TABLE 12

| | Coated pitch (%) | Capacity (mAh/g) | Irreversible capacity loss (mAh/g) | Efficiency (%) |
|---|---|---|---|---|
| Ex. 16 | 7 | 338 | 26 | 93 |

The coated carbonaceous powder particles produced according to Examples 15 and 16, and their resultant excellent electrical properties demonstrated the utility of liquid oxidizing agents.

Example 17

An uncalcined needle coke was crushed in a hammer mill, then milled in a jet mill and classified to remove dust. The resultant powder had particles ranging from about 0.5 to 50 μm and an average particle size of 15 μm. A first solution was prepared by dissolving 24 g of the same low melting petroleum pitch (a 193° C. Mettler softening point, 75% Alcor carbon residue, low ash isotropic petroleum pitch) as used in Example 17 in 24 g of xylene (ACS reagent, ex. Fisher Scientific) at 120° C. in a 50 ml glass flask. In parallel, 30 g of the green needle coke powder and 700 ml of xylene were heated to 130° C. in a 1000 ml glass flask with continuous stirring. The pitch-xylene solution was gradually poured into the coke powder suspension and following the addition the resultant mixture was heated and maintained at 130° C. for 15 minutes under continuous stirring. The heat source was subsequently removed and while the continuous stirring was maintained, the mixture was cooled to ambient temperature (about 22° C.). The resultant solids were separated from the cooled mixture by first filtering the mixture on a vacuum filtration funnel, and thereafter the powder was washed with 200 ml of xylene and dried at 120° C. under vacuum for about 3 hours. The total weight of the resulting powder was 36.9 g. The amount of precipitated pitch on the coke powder was calculated to be about 18.7 wt % of the total mass.

The remaining pitch-xylene solution was poured into an evaporation flask to recover xylene under vacuum at 120° C. and to collect the pitch residue. The softening point of the pitch residue was determined to be about 60° C. using the Mettler softening point technique.

The dried powder was oxidized by mixing the powder thoroughly with 10 g of a 10.3 wt % aqueous solution of sodium nitrate ($NaNO_3$) (A.C.S. reagent, J.T. Baker). The mixture was dried under vacuum at 80° C. and then placed in alumina crucibles and transferred into a vacuum furnace. The furnace was heated at from ambient temperature to 200° C. at a rate of 5° C./minute and then to 325° C. at a rate of 1° C./minute, at which point the crucibles were maintained under vacuum at 325 for 2 hours.

The stabilized sample was carbonized by heating the powder in a nitrogen atmosphere at a rate of 1° C./minute to 350° C. at which point the crucibles were maintained at 350° C. for 2 hours. Thereafter the crucibles containing the stabilized coated carbonaceous particles were further heated at a rate of 1° C./minute to 410° C. at which point the crucibles were maintained at this higher temperature for 2 hours. Subsequently the crucibles containing the stabilized coated carbonaceous particles were further heated at a rate of 5° C./minute to 850° C. at which point the crucibles were maintained at 850° C. for 2 hours, after which the crucibles were cooled at 5° C./minute to room temperature(about 22° C.).

Subsequently the sample was graphitized by transferring it to a graphite crucible and then introducing the crucible into an induction furnace in an argon atmosphere. The crucible was first heated at a rate of 13° C./minute to 2800° C. and thereafter heated at a rate of 5° C./minute to 3000° C. at which time the temperature of the induction furnace was maintained at 3000° C. for a period of 45 minutes, after which graphitization was believed to be essentially complete.

The graphitized powder was tested using the Electrochemical Test Procedure, and the results are shown in Table 13.

Example 18

Calcined needle coke powder was used to prepare the carbonaceous core particles. Calcined petroleum needle coke (calcined at 1100° C.) was first crushed into small pieces with a hammer mill, milled into fine powder with a jet mill, and then classified. The resultant powder had particles sized in the range from 0.5 to about 50 µm, and an average particle size of about 15 µm.

The calcined coke powder was coated with petroleum pitch according to the procedure described in Example 17. The total weight of the resulting powder was 36.7 g. The amount of precipitated pitch on the coke powder was about 18.2% of the total mass.

The dried powder was stabilized carbonized and graphitized as described in Example 17 except that 10 g of a 10% wt. solution of sodium nitrate (stabilization step. The graphitized powder was tested using the Electrochemical Test Procedure, and the results are given in Table 13.

Example 19

The uncalcined petroleum needle coke powder of Example 17 was coated with a heat soaked decant oil distillate petroleum pitch having a Mettler softening temperature of 155° C. The petroleum pitch had a wide molecular size distribution and contained a significant amount of low molecular weight molecules and about 10% high molecular xylene insoluble compounds.

A first solution was prepared by dissolving 50 g of the heat soaked petroleum pitch in 50 g of xylene (ACS reagent, Fisher Scientific, Pittsburgh, Pa.) at 120° C. in a 100 ml glass flask. In parallel, 30 g of the green needle coke powder and 700 ml of xylene were heated to 130° C. in a 700 ml glass flask with continuous stirring. The pitch-xylene solution was gradually poured into the coke powder suspension while the mixture was continuously stirred. The mixture was subsequently heated to 135° C. and continuously stirred for 15 minutes. The heat source was removed and while the continuous stirring was maintained, the mixture was allowed to cool to ambient temperature (about 22° C.). The resultant solids were separated from the cooled mixture and washed with 200 ml of xylene and dried as described in Example 17. The total weight of the resulting powder was 36.5 g. The amount of precipitated pitch on the coke powder was about 17.8 wt %.

The dried powder was stabilized carbonized and graphitized as described in Example 17, except that 10 g of a 9.7% wt. solution of sodium nitrate ($NaNO_3$) was used in the stabilization step. The graphitized powder was tested using the Electrochemical Test Procedure, and the results are given in Table 13.

Example 20

The calcined needle coke powder of Example 18 was coated with the intermediate pitch product described in Example 19.

A first solution was prepared by dissolving 25 g of the heat soaked petroleum pitch in 25 g of xylene (ACS reagent, ex. Fisher Scientific) at 120° C. in a 50 ml glass flask. In parallel, 15 g of calcined coke powder and 150 ml of xylene were heated to 160° C. in a 1000 ml stainless steel vessel with continuous stirring. The pitch-xylene solution was gradually injected under nitrogen pressure into the coke powder suspension while the mixture was continuously stirred. The mixture was subsequently heated to 210° C. and continuously stirred for 15 minutes. The heat source was removed, and while the continuous stirring was maintained, the mixture was cooled to ambient temperature (about 22° C.). The resultant solids were separated from the cooled mixture and washed as described in Example 17. The total weight of the resulting powder was 16.8 g. The amount of precipitated pitch on the coke powder was about 10.7 wt %.

The dried powder was mixed thoroughly with 6 g of a 4.5 wt % aqueous solution of sodium nitrate ($NaNO_3$) (A.C.S. reagent, ex. J.T. Baker). The mixture was dried under vacuum at 80° C. and then stabilized, carbonized and graphitized as described in Example 17. The graphitized powder was tested using the Electrochemical Test Procedure, and the results are given in Table 13.

Example 21

The calcined needle coke powder described in Example 18 was coated with the heat soaked petroleum pitch as described in Example 19.

A first solution was prepared by dissolving 25 g of the heat soaked petroleum pitch in 25 g of xylene at 120° C. in a 50 ml glass flask. In parallel, 15 g of the calcined needle coke powder and 150 ml of xylene were heated to 90° C. in a 1000 ml stainless steel vessel with continuous stirring. The pitch-xylene solution was gradually poured into the coke powder suspension while the mixture was continuously stirred. The mixture was subsequently heated under ambient pressure to 190° C. and continuously stirred for 15 minutes at 190° C. The heat source was removed and while continuous stirring was maintained the mixture was allowed to cool to ambient temperature (about 22° C.). The resultant solids were removed from the mixture, washed and dried as described in Example 17. The total weight of the dried coated powder was 17.9 g. The amount of precipitated pitch on the coke powder was about 16.2 wt %.

The dried powder was mixed thoroughly with 6 g of a 7 wt % aqueous solution of sodium nitrate (A.C.S. reagent, ex. J.T. Baker). The mixture was dried stabilized, carbonized and graphitized as described in Example 17. The graphitized powder was tested using the Electrochemical Test Procedure, and the results are given in Table 13.

Example 22

The calcined needle coke powder of Example 18 was coated with a pitch mixture consisting of 45 parts of the heat soaked pitch used in Example 19 and 55 parts of a low melting petroleum pitch used in Example 17 (a 193° C. Mettler softening point, 75% Alcor carbon residue, low ash isotropic petroleum pitch).

A first solution was prepared by dissolving 40 g of the pitch mixture in 43 g of xylene at 90° C. in a 50 ml glass flask. In parallel, 14.6 g of calcined coke powder and 200 ml of xylene were heated to 160° C. in a 1000 ml stainless steel vessel with continuous stirring. The pitch-xylene solution was gradually poured into the coke powder suspension while the mixture was continuously stirred. The mixture was subsequently heated to 210° C. and continuously stirred for 15 minutes. Subsequently the heat source was removed, and while continuous stirring was maintained, the mixture was allowed to cool to ambient temperature (approx. 22° C.). The resultant solids were separated, washed and dried as described in Example 17. The total weight of the dried coated powder was 17.2 g. The amount of precipitated pitch on the coke powder was about 17.8 wt %.

The dried powder was mixed thoroughly with 6 g of a 6.5 wt % aqueous solution of sodium nitrate (NaNO$_3$) (A.C.S. reagent, ex. J.T. Baker). The mixture was dried, stabilized, carbonized and graphitized as described in Example 17. The graphitized powder was tested using the Electrochemical Test Procedure, and the results are given in Table 13.

Example 23

Calcined petroleum needle coke was coated using the same low melting petroleum pitch as used in Example 17 (a 193° C. Mettler softening point, 75% Alcor carbon residue, low ash isotropic petroleum pitch). The petroleum coke was prepared in a manner similar to that described in Example 18, but the particle sizes ranged from between 0.1 to 50 μm. and the average particle size was about 16 μm.

A first solution was prepared by dissolving 320 g of the petroleum pitch in 320 g of xylene (A.C.S. Reagent, ex. Fisher Scientific) at 100° C. in a 500 ml glass flask. In parallel, 468 grams of coke powder and 1280 grams of xylene were heated to 120° C. in a 6 liter stainless steel pressure vessel with continuous stirring. The pitch-xylene solution was gradually poured into the coke powder suspension while the mixture was continuously stirred The mixture was subsequently heated to 160° C. and continuously stirred for 15 minutes. Subsequently the heat source was removed, and while continuous stirring was maintained, the mixture was allowed to coal to ambient temperature (approx. 22° C.). The resultant solids wvere separated, washed and dried as described in Example 17 with the exception that 750 ml of xylene were used in the washing step. The total weight of the resulting powder was 564 g. The amount of precipitated pitch on the coke powder was about 17 wt %.

The dried powder was mixed thoroughly with 225 g of a 6.4 wt % aqueous solution of sodium nitrate (NaNO$_3$) (A.C.S. reagent, ex. J.T. Baker). The mixture was dried under vacuum at 80° C. After drying, 44 grams of the oxidant-coated powder were set aside for use in Example 24 and 510 grams of the powder were stabilized, carbonized and graphitized as described in Example 17. The graphitized powder was tested using the Electrochemical Test Procedure, and the results are given in Table 13.

Example 24

This example illustrates that a separate carbonization step is not required prior to graphitization. Forty-four grams of the oxidant-coated powder prepared in Example 23 were heated to 450° C. for two hours in an argon environment and then cooled to ambient temperature (approx. 22° C.). The stabilized powder was then transferred to a graphite crucible and graphitized by heating to 3000° C. in an induction furnace under argon as described in Example 17. The resulting powder was tested as described in the Electrochemical Test Procedure and the results are given in Table 13).

Example 25

Spherical graphite particles were coated with the petroleum pitch used in Example 17. The graphite particles were a commercial mesophase carbon microbead (MCMB) powder (available as MCMB-6-28 from Osaka Gas Co. LTD, Japan).

A first solution was prepared by dissolving 7.5 grams of the low melting petroleum pitch described in Example 17 (a 193° C. Mettler softening point, 75% Alcor carbon residue, low ash isotropic petroleum pitch) in 7.5 grams of xylene (A.C.S. reagent, ex. Fisher Scientific) at 90° C. in a 50 ml glass flask. In parallel, 20 grams MCMB powder and 150 ml of xylene were heated to 138° C. in a 500 ml glass flask with continuous stirring. The pitch-xylene solution was gradually poured into the MCMB powder suspension while the mixture was continuously stirred. The mixture was subsequently heated to 138° C. and continuously stirred for 15 minutes. Subsequently the heat source was removed, and while continuous stirring was maintained, the mixture was allowed to cool to ambient temperature (approx. 22° C.). The resultant solids were separated, washed and dried as described in Example 17. The total weight of the resulting powder was 21.9 g. The amount of precipitated pitch on the MCIB powder was about 8.7 wt %.

The dried powder was mixed thoroughly with 6 g of a 4.8 wt % aqueous solution sodium nitrate (NaNO$_3$) (A.C.S. reagent, ex. J.T. Baker). The mixture was dried, stabilized, carbonized and graphitized as described in Example 17. The graphitized powder was tested using the Electrochemical Test Procedure, and the results are given in Table 13.

Example 26

The coating procedure described in Example 17 was conducted using toluene as the solvent instead of xylene.

A first solution was prepared by dissolving 11 g of the pitch used in Example 17 in 11 g of toluene at 90° C. in a 50 ml glass flask. In parallel, 20 g of the calcined needle coke powder used in Example 18 and 150 ml of xylene were heated to 90° C. in a 1000 ml glass flask with continuous stirring. The pitch-toluene solution was gradually poured into the coke powder suspension while the mixture was continuously stirred. The mixture was subsequently heated to 100° C. and continuously stirred for 15 minutes. Subsequently the heat source was removed and while continuous stirring was maintained, the mixture was allowed to cool to ambient temperature (approx. 22° C.). The resultant solids were separated, washed and dried as described in Example 17, with the exception that 200 ml of toluene were used in the washing step and that the sample was dried at 100° C. The total weight of the resulting powder was 22.6 g. The amount of precipitated pitch on the coke powder was calculated as described in Example 17 to be about 11.5 wt %.

The resulted pitch-coated powder was transferred into a 50 ml alumina crucible and then placed in a tube furnace and heated at 1° C./minutes to 300° C. and subsequently held at 300° C. for 10 hours under an absolute pressure of 200 mm of mercury (26.7 kPa). There is sufficient oxygen present at 200 mm of mercury (26.7 kPa) to stabilize the oxidant coated particles during the heat and hold cycles. Subsequently, the coated particles were carbonized and graphitized in the same way as described in example 17. (A.C.S. reagent, ex. J.T. Baker). The graphitized powder was tested using the Electrochemical Test Procedure, and the results are given in Table 13.

Comparative Example 8

A first solution was prepared by dissolving 60 g of the heat soaked petroleum pitch used in Example 19 in 40 g of xylene (ACS reagent, ex. Fisher Scientific) in a 100 ml glass beaker and heating to 80° C. in a water bath. The solvent to pitch ratio was about 2 to 1. In parallel, 20 g of the calcined coke powder described in Example 18 and 80 g of xylene were heated to 80° C. in a 200 ml glass beaker with continuous stirring. The pitch-xylene solution was gradually poured into the coke powder suspension while the mixture was continuously stirred. Subsequently the heat source was removed, and while continuous stirring was maintained, the mixture was allowed to cool to ambient temperature (approx. 22° C.) The resultant solids were separated, washed and dried as described in Example 18 with the exception that 30 g of xylene were used in the washing step. The total weight of the resulting powder was 20.5 g. The amount of precipitated pitch on the coke powder was about 2 wt %.

The dried powder was transferred into a 50 ml alumina crucible, placed in a tube furnace, and heated slowly at 1° C./minute to 300° C. under about 100 torr (13.3 kPa) air pressure and held at 300° C. for 10 hours. The tube furnace was then purged with pure nitrogen gas, and the powder was carbonized as described in Example 17. The carbonized particles were subsequently graphitized as described in Example 17. The graphitized powder was tested using the Electrochemical Test Procedure, and the results are given in Table 13. The results demonstrates that coke particles that were not sufficiently coated with the pitch material resulted in poor charge efficiency.

Comparative Example 9

In a 50 ml glass beaker 2.5 g of a mesophase pitch powder (Mettler softening point approx. 410° C., made by Conoco, Inc.) and 50 g of xylene (ACS reagent, ex. Fisher Scientific) were heated at 90° C. The pitch was only slightly soluble in xylene. In a parallel step, 15 g of the same green needle coke powder as used in Example 17 and 150 ml of xylene were heated to 160° C. in a 500 ml stainless steel pressure vessel with continuous stirring. The mesophase-xylene solution was injected into the coke powder suspension while the mixture was continuously stirred. The mixture was then further heated to 290° C. and was continuously stirred for 15 minutes. Subsequently the heat source was removed, and while continuous stirring was maintained, the mixture was allowed to cool to ambient temperature (approx. 20° C.) The resultant solids were separated, washed and dried as described in Example 17, with the exception that 30 g of xylene were used in the washing step. The total weight of the resulting powder was 16.8 g. The amount of precipitated pitch on the coke powder was about 10.7 wt %. However, it was observed that rather than coating the coke particles, the mesophase pitch was in the form of separate fine particles.

The dried powder was mixed thoroughly with 6 g of an aqueous 4.5 wt % solution of sodium nitrate (A.C.S. reagent, ex. J.T. Baker). The mixture was dried, stabilized, carbonized and graphitized as described in Example 17. The graphitized powder was tested using the Electrochemical Test Procedure and the results are given in Table 13.

Comparative Example 10

The uncoated, calcined coke powder prepared in Example 18 was carbonized and graphitized according to the procedures described in Example 17. The resulting powder was tested using the Electrochemical Test Procedure, and the results are given in Table 13.

Comparative Example 11

Spherical graphite particles of commercial mesophase carbon microbeads (MCMB)

(MCMB-6-28, Osaka Gas Co. LTD., Japan) were tested as received using the Electrochemical Test Procedure, and the results are given in Table 13. The charge efficiency data for uncoated MCMB can be compared with that of Example 25 and illustrates the improved properties of the coated material of Example 25 relative to the uncoated material.

TABLE 13

| Example | Pitch coating level (%) | Capacity (mAh/g) | Capacity loss (mAh/g) | Efficiency (%) |
| --- | --- | --- | --- | --- |
| 17 | 18.7 | 326 | 14 | 95.8 |
| 18 | 18.2 | 329 | 16 | 95.4 |
| 19 | 17.8 | 330 | 16 | 95.4 |
| 20 | 10.7 | 324 | 16 | 95.3 |
| 21 | 16.2 | 330 | 16 | 95.5 |
| 22 | 17.8 | 325 | 15 | 95.7 |
| 23 | 17.0 | 330 | 16 | 95.4 |
| 24 | 17.0 | 326 | 15 | 95.6 |
| 25 | 8.7 | 300 | 16 | 95.0 |
| 26 | 11.5 | 335 | 17 | 95.2 |
| Comp 8 | 2 | 299 | 365 | 45.0 |
| Comp 9 | 10.7 | 294 | 441 | 40.0 |
| Comp 10 | 0 | 290 | 453 | 39 |
| Comp 11 | 0 | 298 | 21 | 93.3 |

Example 27

This example demonstrates the use of petroleum pitch on a natural graphite powder to improve the efficiency and material processing ability.

Natural graphite flake (Aldrich Chemical Company, Milwaukee, Wis.) was milled with a jet milled and classified. The resulting powder had particles in the size range of between 0.1 and about 40 μm and had an average particle size of 13 μm. Twenty grams of the resulting graphite powder was suspended in 150 cc of xylene. A solution of 11 g of the low melting petroleum pitch described in Example 17 (a 193° C. Mettler softening point, 75% Alcor carbon residue, low ash isotropic pitch) dissolved in 11 g of xylene was added to the suspension of graphite particles. The graphite particles were coated in the same manner as described in Example 17 to yield 22.7 g of dry coated particles with a pitch coating level of about 12%. The coated powder was mixed with 1.38 g 30% NaNO3, 8.3 g water and 0.8 g acetone (to aid wetting), dried and then stabilized, carbonized and graphitized as described in Example 17. The graphitized powder was tested using the Electrochemical Test Procedure, and the results are given in Table 14.

Example 28

This example used the same natural graphite as used in Example 27, but with particles in the size range of between 0.1 and about 50 μm and an average particle size of about 15 μm. Twenty grams of the powder was suspended in 150 cc of xylene. A solution of 11 g of the low melting petroleum pitch described in Example 17 (a 193° C. Mettler softening point, 75% Alcor carbon residue, low ash isotropic pitch) dissolved in 11 g of xylene was added to the suspension of graphite particles. The graphite particles were coated as described in Example 17. The resulting dry coated powder weighed 23 g and had a pitch coating level of about 13 wt %. The powder was mixed with 1.45 g 30% sodium nitrate (NaNO3), 8.0 g water and 0.7 g acetone (to aid wetting), dried and then stabilized, carbonized and graphitized as described in Example 17. The graphitized powder was tested using the Electrochemical Test Procedure, and the results are given in Table 14.

Example 29

Natural graphite flake (Asbury Graphite Co., Asbury, N.J.) was milled with a jet mill as described in Example 28 and classified with an air classifier. The resulting powder had particles which ranged in size from between 0.1 and about 40 μm and had an average particle size of about 13 μm. Twenty grams of the powder was suspended in 150 cc of xylene. A solution of 11 g of the low melting petroleum pitch described in Example 17 (a 193° C. Mettler softening point, 75% Alcor carbon residue, low ash petroleum pitch) dissolved in 11 g of xylene was added to the suspension of graphite particles. The graphite particles were coated as described in Example 17. The resulting powder weighed 23 g and had a pitch-coating level of about 13 wt %. The powder was mixed with 1.51 g 30% sodium nitrate (NaNO$_3$), 8.0 g water and 0.7 g acetone (to aid wetting), dried and then stabilized, carbonized and graphitized as described in Example 17. The graphitized powder was tested using the Electrochemical Test Procedure, and the results are given in Table 14.

Example 30

This example uses the natural graphite powder similar to that used in Example 29, but with a range of particle sizes from between 0.1 and 50 μm and an average particle size of 15 μm. Twenty grams of the powder was suspended in 150 cc of xylene. A solution of 11 g of the low melting petroleum pitch described in Example 17 (a 193° C. Mettler softening point, 75% Alcor carbon residue, low ash isotropic petroleum pitch) dissolved in 11 g of xylene was added to the suspension of graphite particles. The graphite particles were coated as described in Example 17. The resulting coated powder weighed 23.1 g and had a pitch coating level of about 13 wt %. Subsequently, the powder was mixed with 1.57 g 30% sodium nitrate (NaNO$_3$), 8.0 g water and 0.7 g acetone (to aid wetting), dried and then stabilized, carbonized and graphitized as described in Example 17. The graphitized powder was tested using the Electrochemical Test Procedure, and the results are given in Table 14.

Example 31

This example used a natural graphite powder similar to that used in Example 29, but which had a range of particle sizes from between 0.1 and about 50 μm and an average particle size of about 15 μm. Twenty grams of the powder was suspended in 150 cc of xylene. A solution of 15 g of the low melting petroleum pitch described in Example 17 (a 193° C. Mettler softening point, 75% Alcor carbon residue, low ash isotropic petroleum pitch) dissolved in 15 g of xylene was added to the suspension of graphite particles. The graphite particles were coated as described in Example 17 The resulting coated powder weighed 24.3 g and had a pitch coating level of about 17.6 wt %. The powder was mixed with 2.26 g 30% sodium nitrate (NaNO$_3$). 7.0 g water and 0.7 g acetone (to aid wetting), dried and then stabilized, carbonized and graphitized as described in Example 17. The graphitized powder was tested using the Electrochemical Test Procedure, and the results are given in Table 14.

Example 32

The natural graphite powder used in Example 30 was coated with the same pitch solution and in the same manner as described in Example 27. The dried coated pitch weighed 23.2 g indicating a pitch coating level of about 13.8 wt %. The powder was mixed with 1.8 g 30% sodium nitrate (NaNO$_3$), 7.0 g water and 0.7 g acetone (to aid wetting), dried and then stabilized, carbonized and graphitized as described in Example 17. The graphitized powder was tested using the Electrochemical Test Procedure, and the results are given in Table 14.

Example 33

Natural graphite flake (Nashu, China) was milled with a jet mill and classified in air. The resulting powder had particles sized in the range of between 0.1 and about 40 μm, and an average particle size of about 12 μm. Twenty grams of the resulting powder was suspended in 150 cc of xylene. A solution of 11 g of the low melting petroleum pitch described in Example 17 (a 193° C. Mettler softening point, 75% Alcor carbon residue, low ash isotropic pitch) dissolved in 11 g of xylene was added to the suspension of graphite particles. The graphite particles were coated in the same manner as described in Example 17. The resulting powder weighed 23.0 g and had a pitch-coating level of 13%. The powder was mixed with 1.71 g 30% sodium nitrate (NaNO₃), 8.0 g water and 0.7 g acetone (to aid wetting), dried and then stabilized, carbonized and graphitized as described in Example 17. The graphitized powder was tested using the Electrochemical Test Procedure, and the results are given in Table 14.

Example 34

A coated natural graphite powder was prepared using the same particles as described in Example 33. Twenty grams of the powder were suspended in 150 cc of xylene. A solution of 14 g of the low melting petroleum pitch described in Example 17 (a 193° C. Mettler softening point 75% Alcor carbon residue, low ash isotropic petroleum pitch) dissolved in 14 g of xylene was added to the suspension of graphite particles. The dried, coated graphite particles weighed 23.9 g indicating a coating level of about 16.3 wt %. The coated powder was mixed with 1.91 g 30% sodium nitrate (NaNO₃), 8.0 g water and 0.7 g acetone (to aid wetting), dried and then stabilized, carbonized and graphitized as described in Example 17. The graphitized powder was tested using the Electrochemical Test Procedure, and the results are given in Table 14.

Comparative Examples 12-14

The milled graphite powders used in Examples 29, 31, and 33 were carbonized and graphitized as described in Example 17. The graphitized powders were tested using the Electrochemical Test Procedure, and the results are given in Table 14.

Surprisingly, the as-milled natural graphite powders had a much higher charge efficiency and higher capacity than the graphitized needle coke powders, but the as-milled natural graphite powders had very poor adhesion to the copper substrate. After pitch coating and heat-treatment, however, the coated powders made with natural graphite were easily dispersed in a PVDF/NMP coating solution and adhered well to the copper substrate.

TABLE 14

| Example | Pitch coating level (%) | Capacity (mAh/g) | Capacity loss (mAh/g) | Efficiency (%) |
| --- | --- | --- | --- | --- |
| 27 | 12 | 350 | 24 | 93.5 |
| 28 | 13 | 370 | 22 | 94.4 |
| 29 | 13 | 380 | 23 | 94.4 |
| 30 | 13 | 375 | 20 | 95.0 |
| 31 | 17.6 | 355 | 19 | 94.9 |
| 32 | 13.8 | 356 | 18 | 95.2 |
| 33 | 13 | 362 | 20 | 94.9 |
| 34 | 16.3 | 356 | 23 | 94.0 |
| Comp 12 | 0 | 354 | 42 | 89.4 |
| Comp 13 | 0 | 360 | 41 | 89.8 |
| Comp 14 | 0 | 365 | 40 | 91.5 |

Example 35

This example demonstrates the use of a fluidized bed reactor in the stabilization step and air as the oxidation/stabilization agent.

A first solution was prepared by dissolving 320 g of the low melting point pitch used in Example 17 (a 193° C. Mettler softening point, 75% Alcor carbon residue, low ash isotropic petroleum pitch) in 320 g of xylene at 100° C. in a 500 ml glass flask. In parallel, 540 g of the milled, calcined needle coke powder used in Example 18 and 1280 ml of xylene were heated to 120° C. in a 6 liter stainless steel vessel with continuous stirring. The pitch/xylene solution was gradually poured into the coke powder suspension while the mixture was continuously stirred. The mixture was subsequently heated to 160° C. under ambient pressure and continuously stirred for 15 minutes. Subsequently the heat source was removed, and while continuous stirring was maintained the mixture was allowed to cool to ambient temperature (approx. 22° C.) The resultant solids were separated, washed and dried as described in Example 17 with the exception that 700 ml of xylene were used in the washing step. The total weight of the resulting powder was 622 g. The amount of precipitated pitch on the coke powder was about 13.2 wt %.

The dried powder was gently sieved through a 120 mesh (125 μm) sieve. One hundred grams of the sieved powder was weighed and placed into a stainless steel laboratory fluidized bed reactor [in-house designed, reactor chamber size: 5 inch (12.7 cm) diameter and 4.5 inch (11.4 cm) high]. The reactor was placed into a heated sand bath that had been pre-heated to 150° C. The inlet air and the sand bath temperatures were increased to 275° C. at a rate if 6° C./minute and held at 275° C. for 15 minutes. The reactor then was removed from the sand bath, and the inlet gas was shifted to nitrogen gas so that the stabilized powder and the reactor could cool to ambient temperature (approx. 22° C.).

Fifty grams of the stabilized powder were placed in an alumina crucible. The crucible was placed in a tube furnace and heated at a rate of 5° C./minute to 850° C. in pure nitrogen, held at 850° C. for 2 hours, and then cooled at a rate of 5° C./minute to ambient temperature (approx. 22° C.). The powder was transferred into a graphite crucible and graphitized in an induction furnace as described in Example 17. The graphitized powder was tested using the Electrochemical Test Procedure, and the results are given in Table 15.

Examples 36-38

These examples demonstrate the effect of different stabilization temperature profiles. One hundred grams of the pitch-coated powder produced by the procedure described in Example 35 were used in each of the examples.

In Example 36, the sand bath was pre-heated to 200° C. prior to dropping the reactor into the sand bath. The sand bath and the inlet air were heated at a rate of 6° C./minute to 275° C.

In Example 37, the sand bath was pre-heated to 230° C. prior to dropping the reactor into the sand bath. The sand bath and the inlet air were heated at a rate of 6° C./minute to to 300° C. and held for 15 minutes. In Example 38, the sand bath was pre-heated to 280° C. After the reactor was dropped into the sand bath, the temperature at the gas outlet rapidly increased to 400° C. The inlet gas was quickly shifted to nitrogen gas, and the reactor was pulled out of the sand bath and allowed to cool to ambient temperature.

Fifty grams of each of the air-stabilized powders were transferred into separate graphite crucibles and carbonized and graphitized as described in Example 17. The graphitized powders were tested using the Electrochemical Test Procedure, and the results are given in Table 15.

Examples 39-42

These examples demonstrate the effect of eliminating the step of carbonizing the stabilized coated particles prior to graphitization.

Examples 39-42 used the air-stabilized powders produced by the processes described in Examples 35-38, respectively. Following stabilization, the powders were transferred into separate graphite crucibles and graphitized as described in Example 17. The graphitized powders were tested using the Electrochemical Test Procedure, and the results are given in Table 15. The data for each of the examples shows that the graphite powders all had charge efficiencies of greater than 93%.

TABLE 15

| Example | Capacity (mAh/g) | Capacity loss (mAh/g) | Efficiency (%) |
|---|---|---|---|
| 35 | 330 | 17 | 95.1 |
| 36 | 322 | 21 | 93.9 |
| 37 | 331 | 17 | 95.2 |
| 38 | 338 | 16 | 95.6 |
| 39 | 327 | 24 | 93.1 |
| 40 | 328 | 23 | 93.5 |
| 41 | 330 | 19 | 94.6 |
| 42 | 339 | 16 | 95.6 |

Examples 43-45

A first solution was prepared by dissolving 65 g of the same petroleum pitch as used in Example 1 (a 210° C. Mettler softening point, 75% Alcor carbon residue, <100 ppm ash isotropic petroleum pitch) in 65 g of xylene at 120° C. in a 100 ml glass flask. In parallel, a mixture of 100 g of −400 mesh (38 μm) natural graphite powder (Chuetsu Graphite Works Co. Ltd, Osaka, Japan) and 400 ml of xylene were heated to 130° C. in a 500 ml glass flask with continous stirring. The pitch-xylene solution was gradually poured into the graphite powder suspension while the mixture was continuously stirred. The mixture was subsequently heated to 140° C. and continuously stirred for 15 minutes. Subsequently the heat source was removed, and while continous stirring was maintained, the mixture was allowed to cool to ambient temperature (approx. 22° C.). The resultant solids were separated from the solution by filtering the mixture using a vacuum filtration funnel. The powder was then washed with 200 ml of xylene and dried at 120° C. under vacuum for about 3 hours. The total weight of the resulting powder was 118 g. The amount of precipitated pitch on the graphite powder was calculated to be about 15 wt % of the total mass. The pitch-coated particles were transferred into a stainless steel tray and were stabilized in air in the same way as described in Example 26.

The stabilized coated particles were then either directly graphitized at 3000° C. (Example 43), carbonized at 1200° C. (Example 44), or carbonized at 900° C. (Example 45).

The powders produced by Examples 43-45 were tested using the Electrochemical Test Procedure, and the results are shown in Table 16.

The cell voltage versus lithium was also measured as a function of the discharge capacity for each of these materials (FIG. 1). The data shows that although the overall capacity of Example 43 and Example 45 were nearly the same within the potential window of 0 to 2 volts, the capacity distribution at different electrode potentials was quite different. The potential increased sharply after 0.5 volts for Example 43, whereas it increased slowly with a fairly large shoulder after 0.5 volts for Example 45. Example 43 also had a higher practical capacity and a higher charge efficiency than Example 45. If the cut-off potential for the anode material is 0.5 volts versus Li, the remaining capacity at the potential above 0.5 volts would not be seen in a practical device.

Figure 2:
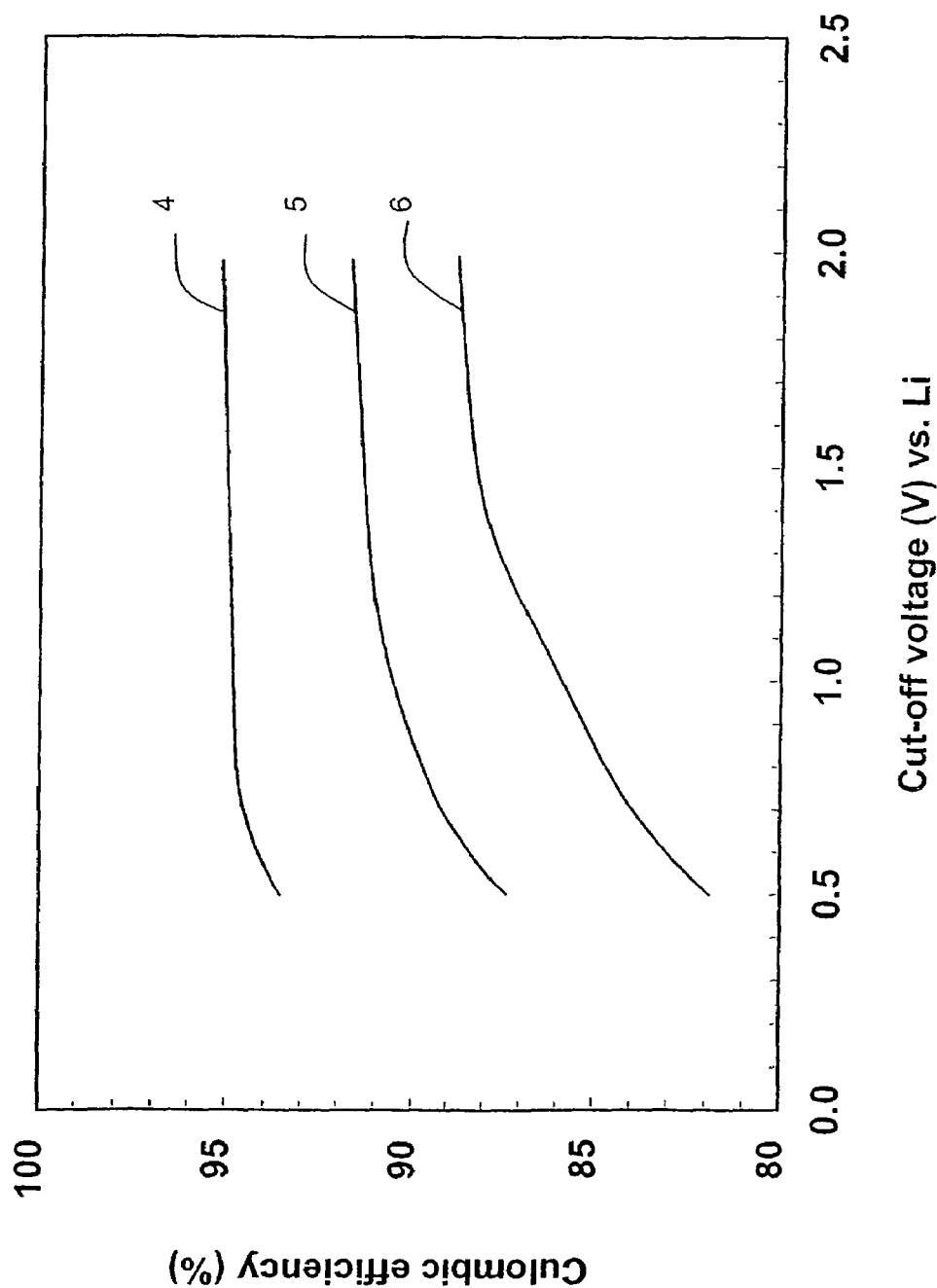
FIG. 2 shows a plot of coulombic efficiency versus cut-off voltage for the materials prepared in Examples 43-45.

FIG. 2 illustrates the relationship between the initial charge efficiency and the cut-off potential for the materials prepared in Examples 43-45. The data indicates that the initial charge efficiency of Example 45 strongly depended on the cut-off potential. For Example 45 the charge efficiency was 82% at the cut-off potential of 0.5 volts, whereas that of Example 43 increased less than 2% from 0.5 to 2 volts.

Examples 43-45 illustrate that the carbonization/graphitization temperature has a significant effect on both the capacity and efficiency of the pitch-coated graphite particle powder. At a low temperature such as 900° C. (<1000° C.), the first cycle efficiency is low, and even lower if the cut-off potential is below 1 volt. As the carbonization temperature is increased, the capacity decreases as Example 44 demonstrates, but the efficiency increases. When the carbonization/graphitization temperature is increased to above 2200° C., both the capacity and efficiency increase, as shown by Example 45. Therefore, it is desirable to graphitize the composite particle powder at temperatures higher than 2200° C.

TABLE 16

| Example | Coated Pitch (%) | Capacity (mAh/g) | Irreversible Capacity Loss (mAh/g) | Efficiency (%) |
|---|---|---|---|---|
| 43 | 15 | 347 | 17 | 95.2 |
| 44 | 15 | 335 | 42 | 88.8 |
| 45 | 15 | 344 | 31 | 91.7 |

A number of embodiments of the invention have been described. Nevertheless, it will be understood that various modifications may be made without departing from the spirit and scope of the invention. Accordingly, other embodiments are within the scope of the following claims.

What is claimed is:

1. A process for the production of coated carbonaceous particles comprising: providing a first solution of a carbon residue forming material, wherein the first solution comprises one or more solvents and a carbon residue forming material selected from materials which, when oxidized and then thermally decomposed in an inert atmosphere to a carbonization temperature of at least 850° C., form a residue which is at least 90 wt. % carbon; providing particles of a carbonaceous material as a dispersion in a second solution comprising one or more solvents; mixing the first solution of the carbon residue forming material and the dispersion of particles of the carbonaceous material at an elevated temperature; depositing a coating of the carbon residue forming material onto the surface of the carbonaceous particles; and stabilizing the coated particles by subjecting the coated particles to an oxidation reaction.

2. The process of claim 1, further comprising adding one or more solvents to the mixture of the first solution and the dispersion of particles.

3. The process of claim 1, further comprising carbonizing the coated particles.

4. The process of claim 3, wherein the coated particles are carbonized in an inert atmosphere at a temperature of greater than about 400° C.

5. The process of claim 3, wherein the coated particles are carbonized in an inert atmosphere at a temperature of between about 40° C. to about 2000° C.

6. The process of claim 3, further comprising graphitizing the coated particles.

7. The process of claim 1, further comprising graphitizing the coated particles.

8. The process of claim 7, wherein the coated particles are graphitized at a temperature of greater than about 2000° C.

9. The process of claim 7, wherein the coated particles are graphitized at a temperature of greater than about 2000° C.

10. The process of claim 1, wherein the coated particles are separated from the mixture of the first solution of the carbon residue forming material and the particles of a carbonaceous material.

11. The process of claim 10, wherein the coated particles are washed and dried.

12. The process of claim 10, further comprising recovering the one or more solvents from the mixture.

13. The process of claim 12, wherein the one or more solvents are recovered by one or more steps selected from the group consisting of distillation or evaporation.

14. The process of claim 12, wherein the recovered solvent is reused in the first solution of carbon residue forming material.

15. The process of claim 1, wherein the solvent is selected from the group consisting of toluene, benzene, xylene, quinoline, tetrahydrofuran, tetrahydronaphthalene, naphthalene, methanol, acetone, 1-methyl-pyrrolidinone and water.

16. The process of claim 1, wherein the first solution is mixed at an elevated temperature to dissolve the carbon residue forming material in the one or more solvents.

17. The process of claim 1, wherein the second solution is mixed at an elevated temperature.

18. The process of claim 1, wherein the ratio of the one or more solvents to the carbon residue forming material in the first solution is 1:1 or less.

19. The process of claim 1, wherein the ratio of the one or more solvents to the carbon residue forming material in the mixture of the first and second solutions greater than 2:1.

20. The process of claim 1, wherein the ratio of the one or more solvents to the carbon residue forming material in the mixture of the first and second solutions is greater than about 5:1.

21. The process of claim 1, wherein the coating of carbon residue forming material is deposited under ambient or higher pressure.

22. The process of claim 21, wherein the coating of carbon residue forming material is deposited at a temperature of about −50° C. to about 400° C.

23. The process of claim 1, wherein the carbonaceous particles comprise a pulvurent carbonaceous material selected from the group consisting of petroleum pitches, calcined petroleum cokes, uncalcined petroleum cokes, highly crystalline cokes, coal tar cokes, synthetic graphites, natural graphites, soft carbons derived from organic polymers, and soft carbons derived from natural polymers.

24. The process of claim 1, wherein the particles have an average particle size of up to about 150 µm.

25. The process of claim 1, wherein the particles have an average particle size of between about 5 µm to about 70 µm.

26. The process of claim 1, wherein the particles have an average particle size of between about 5 µm and about 45 µm.

27. The process of claim 1, wherein the carbon residue forming material is deposited onto the surface of the particles by selectively precipitating the carbon residue forming material onto the particles.

28. The process of claim 1, wherein the carbon residue forming material is a polymeric material selected from the group consisting of heavy aromatic residues from petroleum and coal of chemical processes, lignin from pulp industry, phenolic resins, and carbohydrate materials.

29. The process of claim 1, wherein the carbon residue forming material is selected from the group consisting of petroleum pitches and coal tar pitches or pitches produced by chemical processes.

30. The process of claim 1, wherein the carbon residue forming material is deposited onto the surface of the particles in amounts of between about 1% and about 50% by weight.

31. The process of claim 1, wherein the carbon residue forming material is deposited onto the surface of the particles in amounts of between about 2.5% and 25% by weight.

32. The process of claim 1, wherein the oxidation reaction is carried out in the presence of an oxidizing agent.

33. The process of claim 32, wherein the oxidizing agent is a solid oxidizing agent selected from the group consisting of inorganic and organic oxidizing agents.

34. The process of claim 33, wherein the solid oxidizing agent is selected from the group consisting of alkali nitrates and alkali sulfates.

35. The process of claim 33, wherein the solid oxidizing agent comprises a compound having the formula $M'OX$, wherein $M'$ is selected from the group consisting of transition metals, inorganic salts, and organic salts, and wherein x is an integer between 0.5 and 3.

36. The process of claim 32, wherein the oxidizing agent is a liquid oxidizing agent.

37. The process of claim 36, wherein the liquid oxidizing agent is selected from the group consisting of oxidizing acids, aqueous solutions containing oxidizing salts, non-aqueous solutions containing oxidizing salts, peroxides and aryl quinones.

38. The process of claim 32, wherein the oxidizing agent is a gaseous oxidizing agent selected from the group consisting of oxygen, sulfur fumes, gaseous oxides, nitrogen oxide gas, ambient air, and halogens.

39. The process of claim 32, wherein the oxidation is carried out at elevated temperatures.

40. The process of claim 39, wherein the elevated temperature is supplied in a controlled manner with temperature ramps and hold periods.

41. The process of claim 32, wherein the oxidation is carried out under reduced pressure.

42. A process for the production of coated carbonaceous particles having substantially smooth coatings formed of an oxidized, carbon residue forming material comprising: providing a first solution of a carbon residue forming material selected from the group consisting of petroleum pitches and coal tar pitches, wherein the first solution comprises one or more solvents selected from the group consisting of toluene, xylene, quinoline, tetrahydrofuran, tetrahydronaphthalene, and naphthalene; providing particles of a carbonaceous material selected from the group consisting of calcined or un-calcined petroleum cokes, natural graphite and synthetic graphite, wherein the particles are provided in a second solution comprising one or more solvents; mixing the first solution and the second solution at an elevated temperature; depositing a coating of the carbon residue forming material onto the surface of the particles; and stabilizing the coated particles by subjecting the particles to an oxidation reaction; and carbonizing the coated particles.

43. The process of claim 42 in which the carbonaceous material is selected from calcined or uncalcined petroleum cokes, further comprising graphitizing the coated particles.

44. The process of claim 42, wherein the coated particles are carbonized in an inert atmosphere at a temperature of greater than about 400° C.

45. The process of claim 42, wherein the coated particles are carbonized in an inert atmosphere at a temperature of between about 550° C. to about 1500° C.

46. The process of claim 43, wherein the coated particles are graphitized in an inert atmosphere at a temperature of greater than about 2500° C.

47. The process of claim 1, wherein the coating of the particles is enhanced by effecting a partial precipitation of the carbon residue forming material onto the surface of the carbonaceous particles.

48. The process of claim 47, wherein the partial precipitation is effected by dilution of a concentrated solution of a carbon residue forming material by adding more of the same or one or more different solvents.

49. The process of claim 48, wherein the ratio of solvent to carbon residue forming material in the concentrated solution is 2:1 or less and the ratio of solvent to carbon residue forming material in the diluted solution is greater than 2:1.

50. The process of claim 48, wherein the ratio of solvent to carbon residue forming material in the concentrated solution is 2:1 or less and the ratio of solvent to carbon residue forming material in the diluted solution is greater than 5:1.

51. The process of claim 47, wherein partial precipitation of the carbon residue forming material is effected by cooling the mixture of carbonaceous particles and carbon residue forming material during the coating step.

52. The process of claim 1, wherein the coating of carbon residue forming material is deposited under ambient or higher pressure.

* * * * *

UNITED STATES PATENT AND TRADEMARK OFFICE
CERTIFICATE OF CORRECTION

| | | |
|---|---|---|
| PATENT NO. | : 7,323,120 B2 | Page 1 of 1 |
| APPLICATION NO. | : 10/501311 | |
| DATED | : January 29, 2008 | |
| INVENTOR(S) | : Zhenhua Mao et al. | |

It is certified that error appears in the above-identified patent and that said Letters Patent is hereby corrected as shown below:

Column 43,
Line 45, "of about -50° C." should read --of about -5°C.--.

Signed and Sealed this

Sixth Day of May, 2008

JON W. DUDAS
*Director of the United States Patent and Trademark Office*